June 28, 1966    P. T. FARNSWORTH    3,258,402
ELECTRIC DISCHARGE DEVICE FOR PRODUCING
INTERACTIONS BETWEEN NUCLEI
Filed Jan. 11, 1962    18 Sheets-Sheet 4
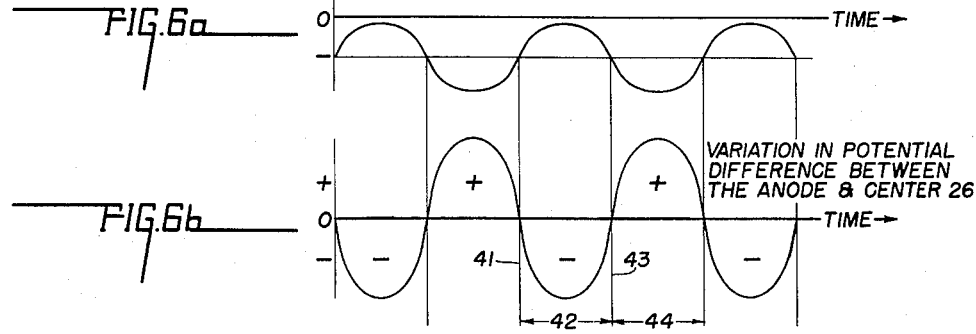
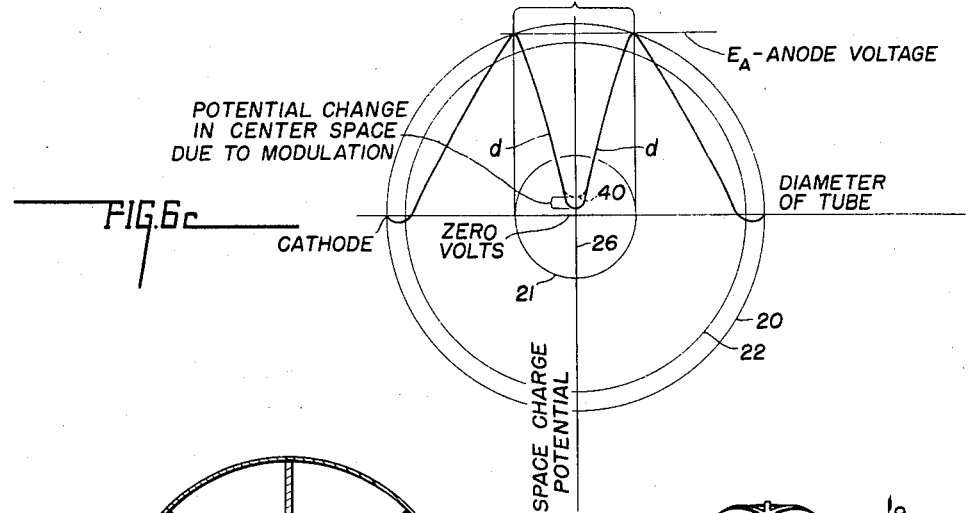
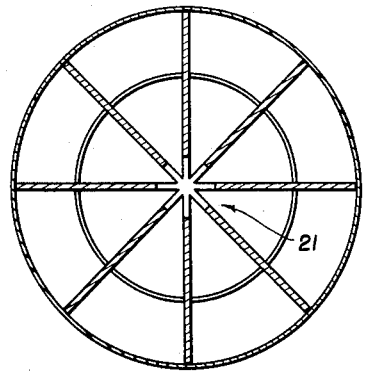
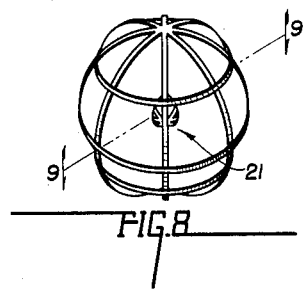
INVENTOR.
PHILO T. FARNSWORTH
BY George A. Gust
ATTORNEY

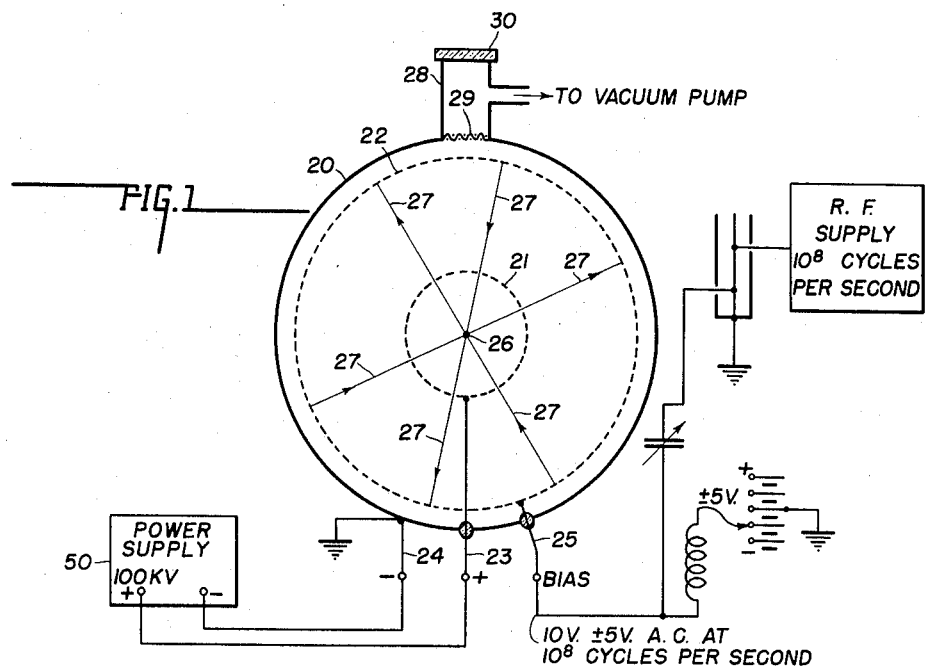
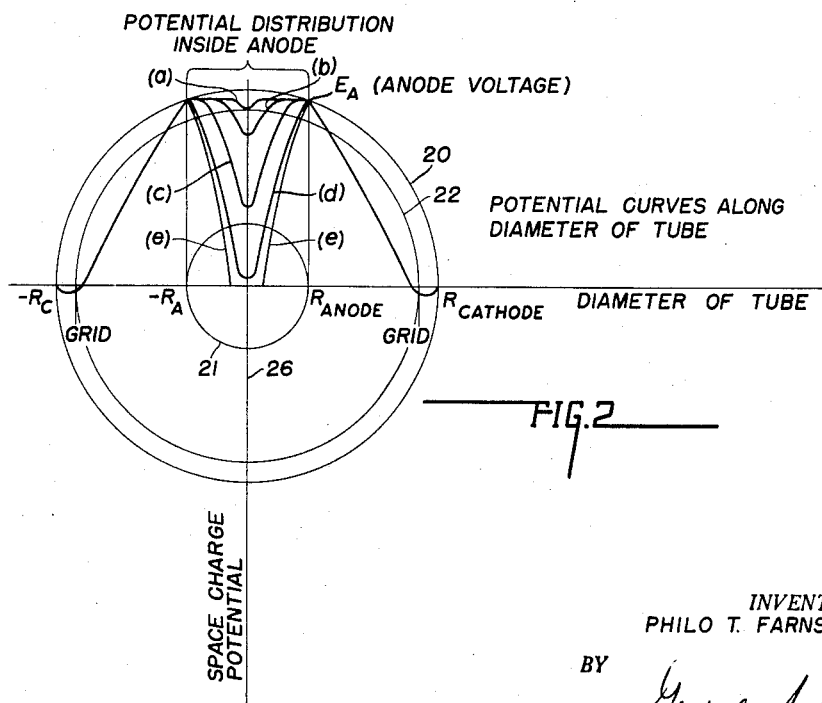

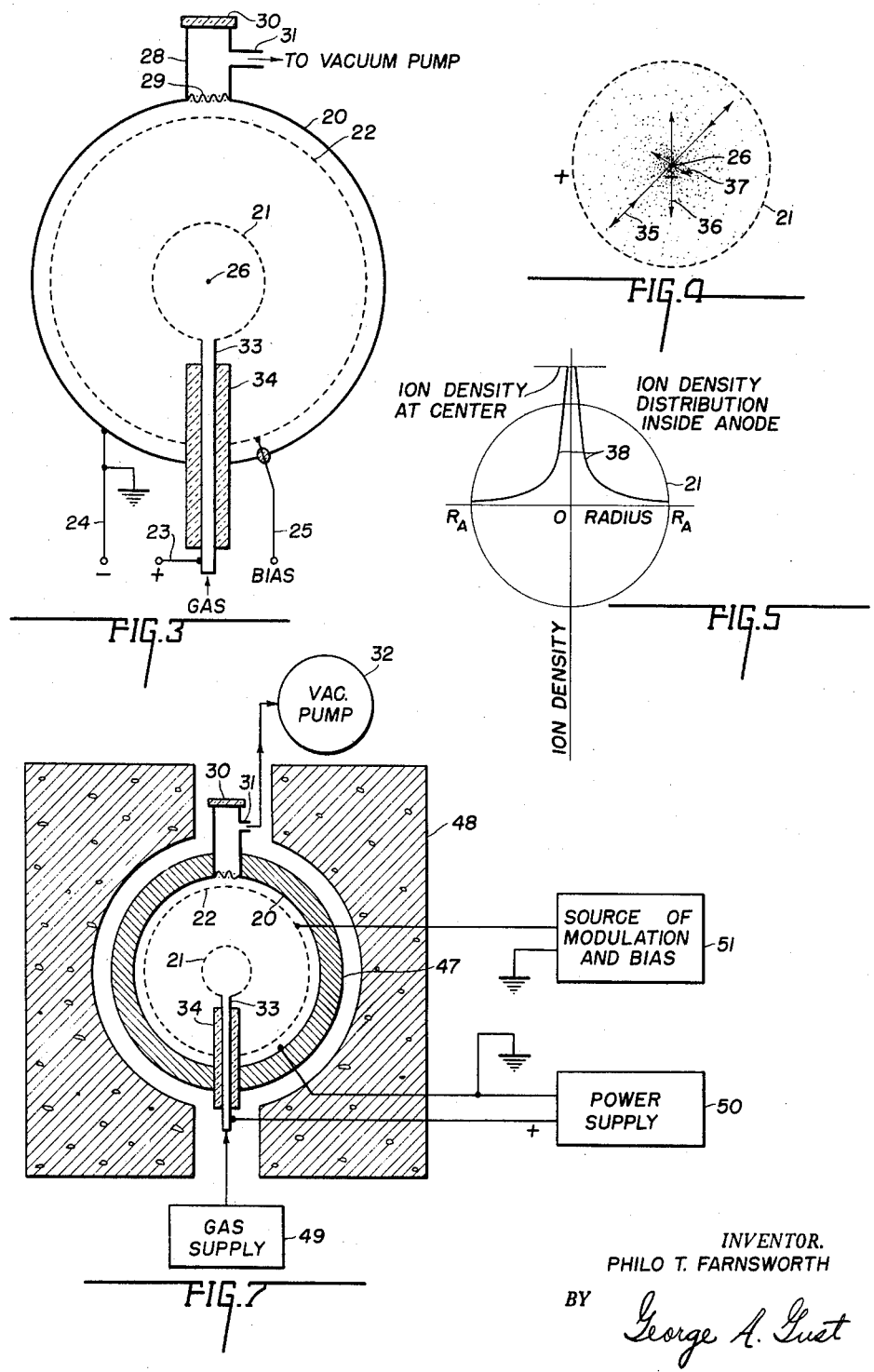

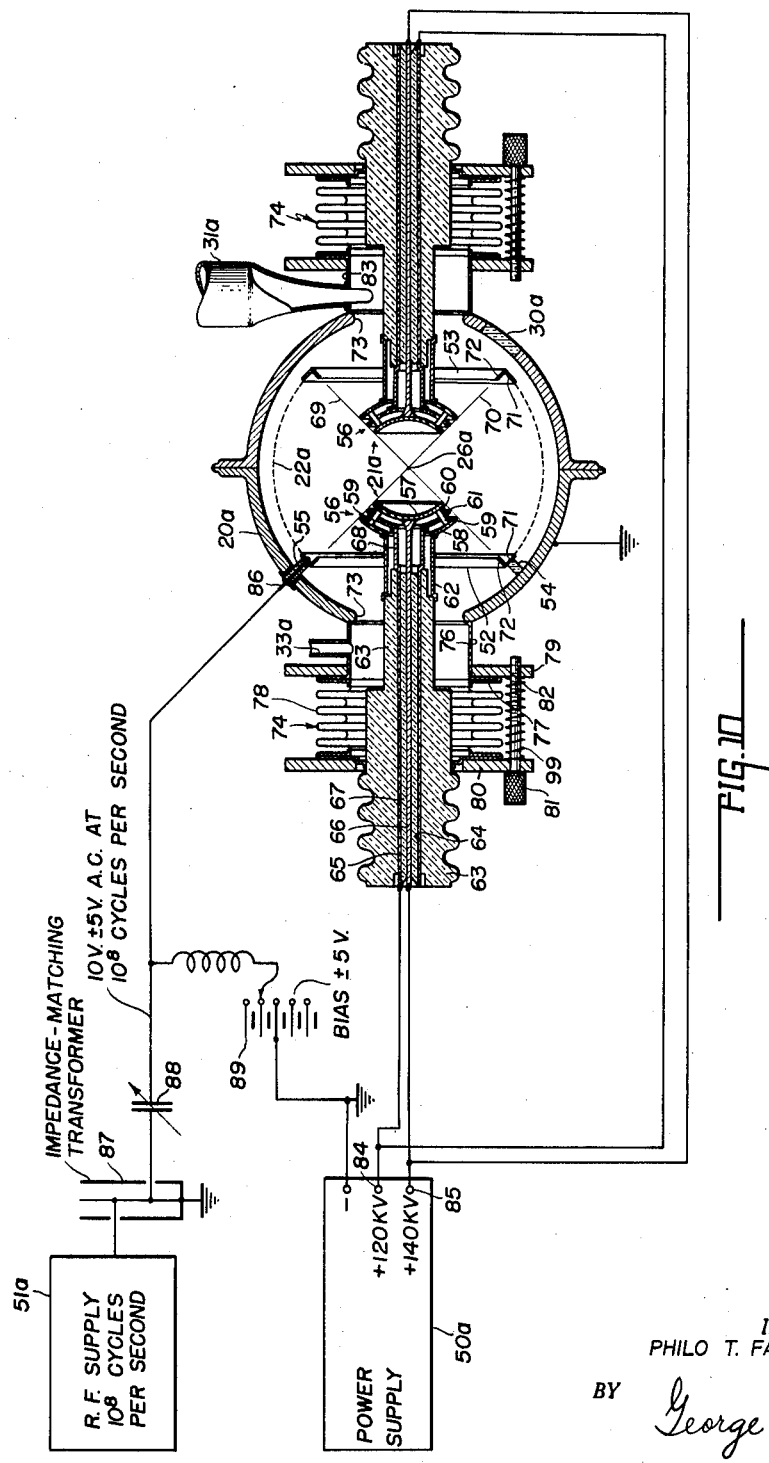

Inventor:
Philo T. Farnsworth,
by
Attorneys.

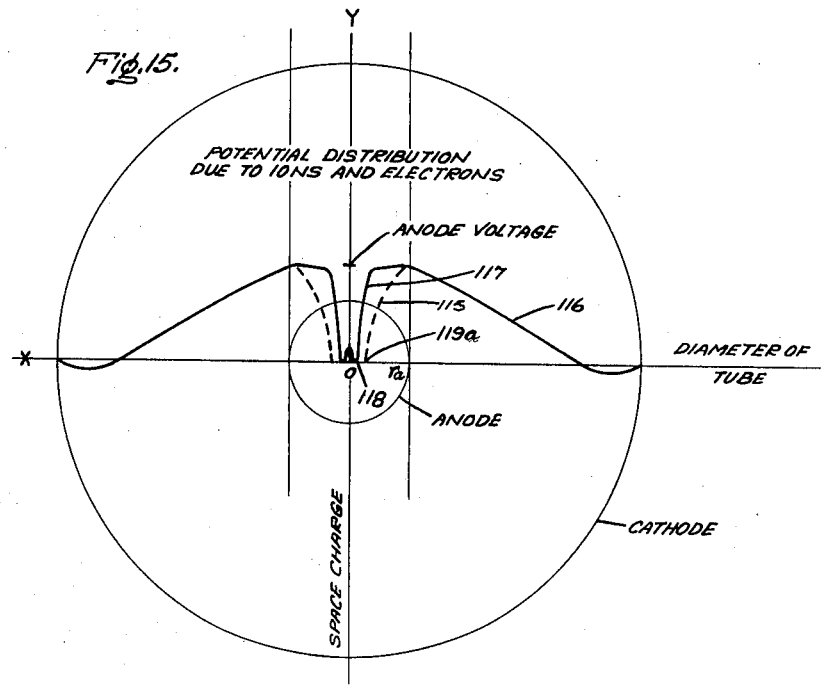
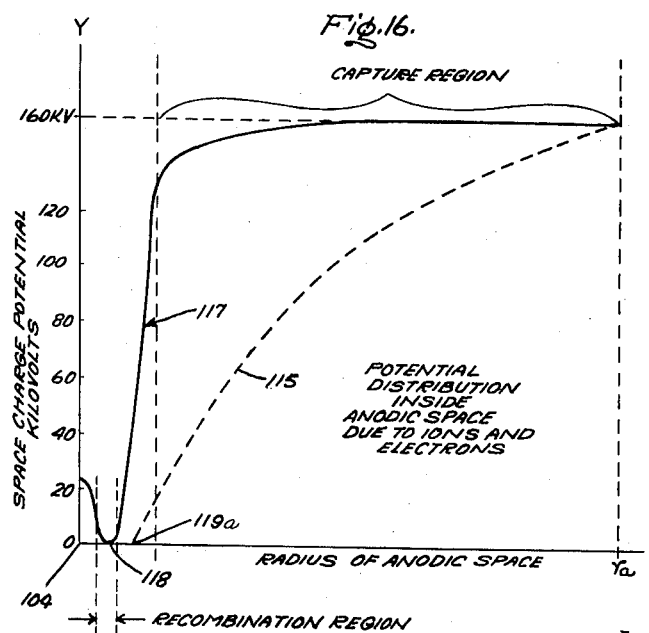

June 28, 1966 P. T. FARNSWORTH 3,258,402
ELECTRIC DISCHARGE DEVICE FOR PRODUCING
INTERACTIONS BETWEEN NUCLEI
Filed Jan. 11, 1962 18 Sheets-Sheet 9
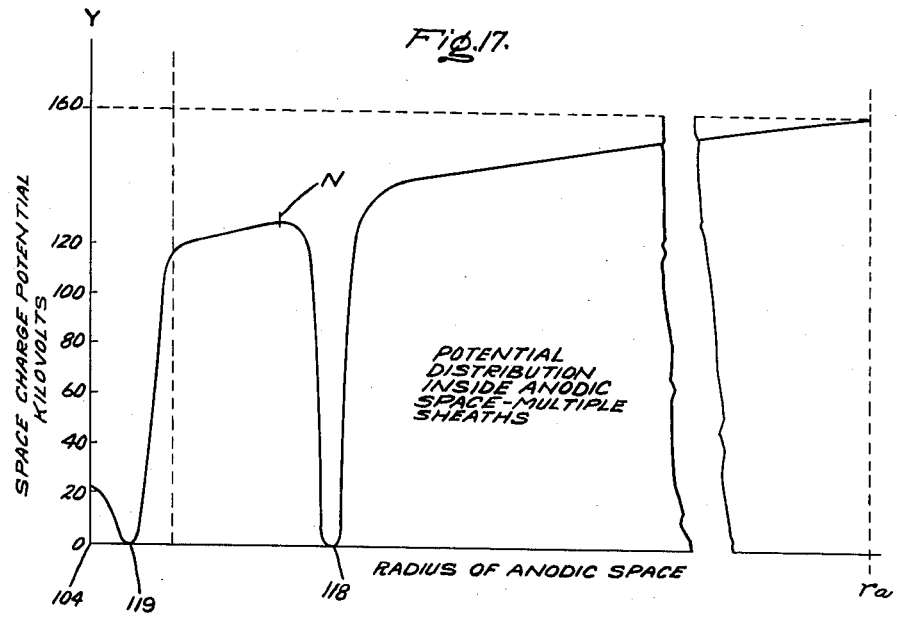
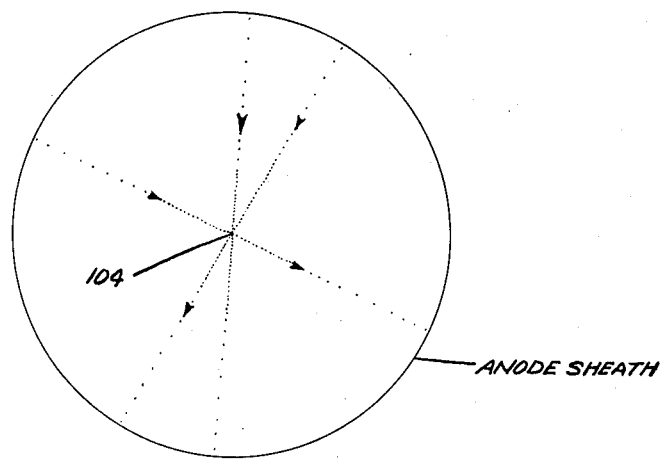
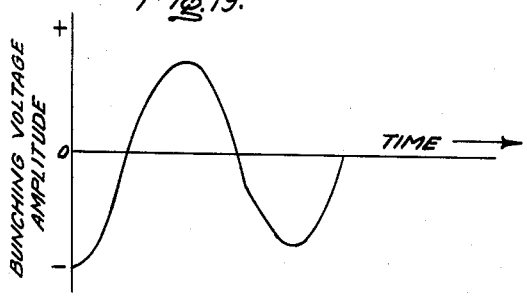
Inventor:
Philo T. Farnsworth,
by Hood, Gust & Irish
Attorneys.

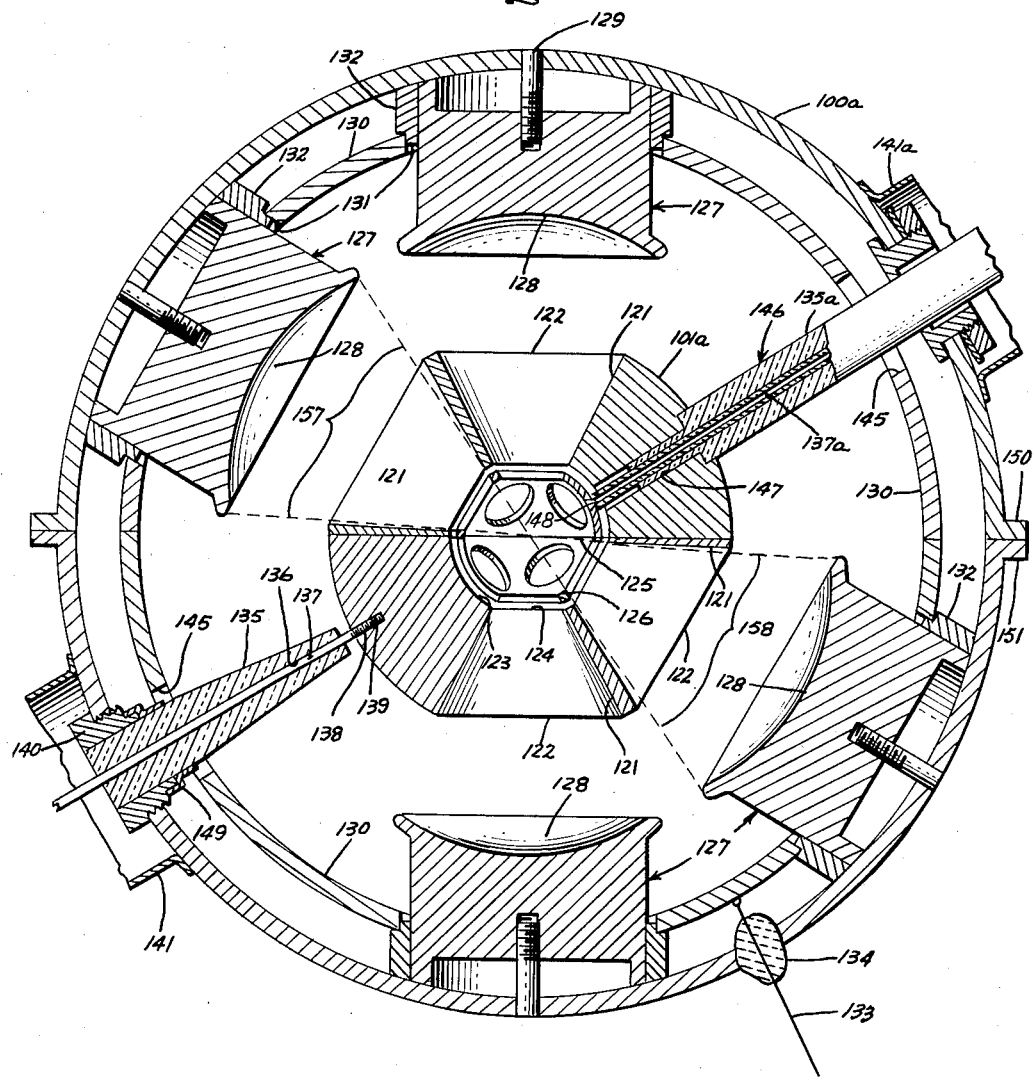

Inventor:
PHILO T. FARNSWORTH,
by Just & Irish
Attorneys.

Inventor:
Philo T. Farnsworth
by Just & Osiak
Attorneys.

June 28, 1966  P. T. FARNSWORTH  3,258,402
ELECTRIC DISCHARGE DEVICE FOR PRODUCING
INTERACTIONS BETWEEN NUCLEI
Filed Jan. 11, 1962  18 Sheets-Sheet 17

Inventor:
Philo T. Farnsworth
by Lust & Drish
Attorneys.

Inventor:
Philo T. Farnsworth,
by Hood, Just & Irish
Attorneys.

United States Patent Office 3,258,402
Patented June 28, 1966

3,258,402
ELECTRIC DISCHARGE DEVICE FOR PRODUCING INTERACTIONS BETWEEN NUCLEI
Philo T. Farnsworth, Fort Wayne, Ind., assignor to International Telephone and Telegraph Corporation
Filed Jan. 11, 1962, Ser. No. 165,639
26 Claims. (Cl. 176—1)

This application is a continuation-in-part of Philo T. Farnsworth application Serial No. 583,291, filed May 5, 1956, now abandoned, and application Serial No. 63,411, filed October 18, 1960, now abandoned.

The present invention relates to a space charge device, and more particularly to a space charge device having utility for producing nuclear reactions.

In producing nuclear reactions, this invention utilizes unique apparatus for creating an electric field in space within which charged nuclear particles are oscillated at a sufficient velocity that resulting collisions of particles produces nuclear reactions. One such apparatus is an electron tube structure having concentrically arranged cathode and anode elements, the anode element being electron permeable and supported within the cathode element. Electrons emitted by the cathode permeate the anode element and approach the center thereof at which point they exert electrical repulsion forces on each other. As a consequence, the velocities of the electrons as they approach the anode center decrease, giving rise to a space charge buildup which correspondingly reduces the space potential with respect to the anode, and very near the exact center of the anode the electrons, for all practical purposes, nearly stop, thereby producing a small virtual cathode.

Atomic particles in the anodic space are ionized by collision with the electrons, the ion density being greatest at the anodic center on virtual cathode. Ions formed inside the anode are oscillated at nuclear-reacting velocities through the anodic center by the forces of the anodic space potential, so that nuclear collisions result which produce nuclear reactions. The magnitude of energy liberation and character of reactant products of such reactions will depend upon the nuclear compositions of the atomic particles used, the kinetic energies involved, and the other factors pertinent to nuclear reactions, the particular parameters and constituents used depending upon the type of reaction and energies desired.

It is therefore an object of this invention to provide a virtual cathode in free space which may be utilized in conjunction with means for ionizing atomic particles.

It is another object to provide a device for oscillating projectile particles through a region of free space in sufficient numbers to cause collisions thereof which generate nuclear reactions.

It is another object to provide improved means for controlling the introduction of atomic particles into the anodic space whereby the neutral gas density in the electron tube may be independently adjusted.

It is yet another object to provide improved means for generating ions whereby power loss in the use of electrons from the electron space current may be appreciably reduced.

It is another object to provide means for controlling the balance between the quantities of electrons and ions in the tube.

It is a further object to provide electron optical means whereby an electric space charge field is developed in which ions will be trapped to execute long-lived oscillations through a point-like region in an anodic space. As a corollary, it is another object to reduce electron temperature to a minimum whereby circulatory currents of high order magnitude may be achieved.

Another object is to provide a method of converging a space current onto a common point-like region for developing an electrical field which oscillates ions through said region until the ions interact with each other.

A further object is to provide a method of producing nuclear reactions by establishing an electric field in free space, this field having a potential minimum in a given point-like region and a potential maximum in a surface surrounding said region, then introducing ions into said field which are thereby propelled repeatedly through said region until collisions occur.

Yet another object is to provide a method of producing ionic oscillations through a point-like region in space by concentrating electron flow onto said region for producing a potential gradient which increases progressively radially outwardly from said region, and then introducing ions into the field of said potential gradient, these ions thereby being oscillated through said region.

Other objects will become apparent as the description proceeds.

The above and other objects are accomplished by an electric discharge device comprising means for forming a space current, means for converging said space current toward a reference point in said free space to produce a localized virtual cathode adjacent to that point, and means for propelling projectile particles through said virtual cathode at nuclear-reacting velocities whereby particle collisions will result in nuclear reactions.

For one form of the invention the electric discharge device is of spherical geometry in which a cathode concentrically surrounds an electron permeable anode having an inner, concentric cavity or space. Electrically, this space is spherical. In operation, an electrical discharge composed of high order magnitude electron and ion currents, in this space, develops a radial potential distribution which is, generally speaking, a minimum at the center and a maximum adjacent to the anode. Ions created at points intermediate this center and the anode fall toward and oscillate through the center at velocities dependent upon operating potentials used. With potentials of sufficiently high magnitude, the ions are propelled at nuclear-reacting velocities whereupon ion collisions at the center produce nuclear reactions.

The anode and cathode are uniquely designed and assembled such as to form an electron-optical system wherein the anodic space (spherical in shape) is maintained completely filled with the electrical discharge without the electrons reaching the anode structure itself. Traversing electrons follow radial paths through the space and are kept from being intercepted by the anode, the electron optics directing the electrons through the permeable portions of the anode toward the outer, structural cathode. Electron temperature is maintained at a minimum value resulting in the development of a high order magnitude electron circulatory current which serves in producing the necessary potential gradient in the anodic space.

An ion gun attached to the cathode generates and injects ions directly into the anodic space, means being provided for controlling the quantity of ions so injected. This provides means for adjusting the neutral gas pressure as well as eliminating power losses which are involved if ions are produced by the electron current itself.

Reactant products of the ion or particle collisions at the center vary depending upon operating parameters and gases used; typical of these products are neutrons, X-rays and isotopes.

The above-mentioned and other features and objects of this invention and the manner of attaining them will become more apparent and the invention itself will be best understood by reference to the following description of various embodiments of the invention taken in conjunction with the accompanying drawings, wherein:

FIG. 1 is a cross-sectional view, in schematic form, of one embodiment of this invention;

FIG. 2 is a graph used in explaining the operation of the device of FIG. 1;

FIG. 3 is a schematic cross-section of the device of FIG. 1 with an inlet gas tube added;

FIG. 4 is a diagrammatic illustration of the space inside the anode element of the preceding figures depicting ionic concentration;

FIG. 5 is a graph used in explaining the operation of the invention;

Figure 11:
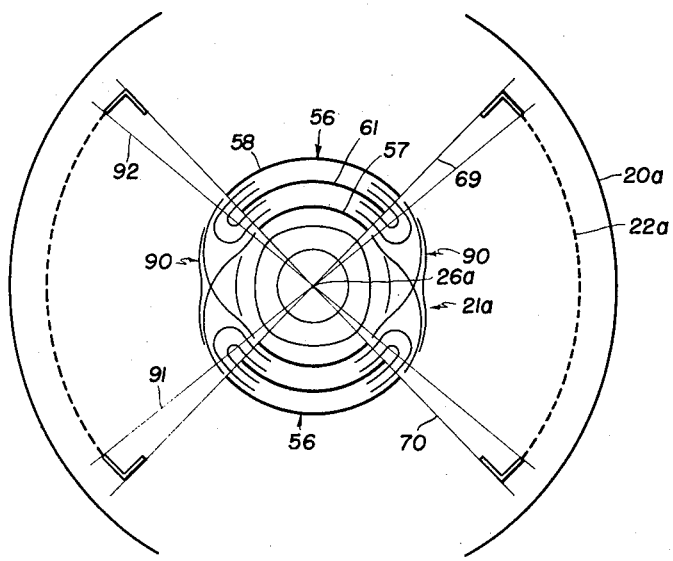
Figure 12:
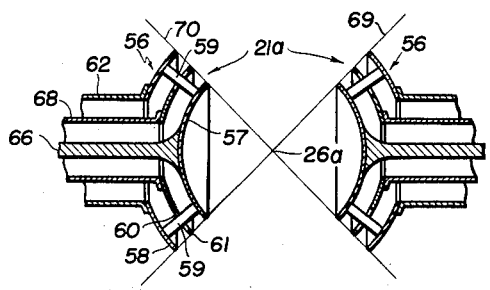
Figure 13:
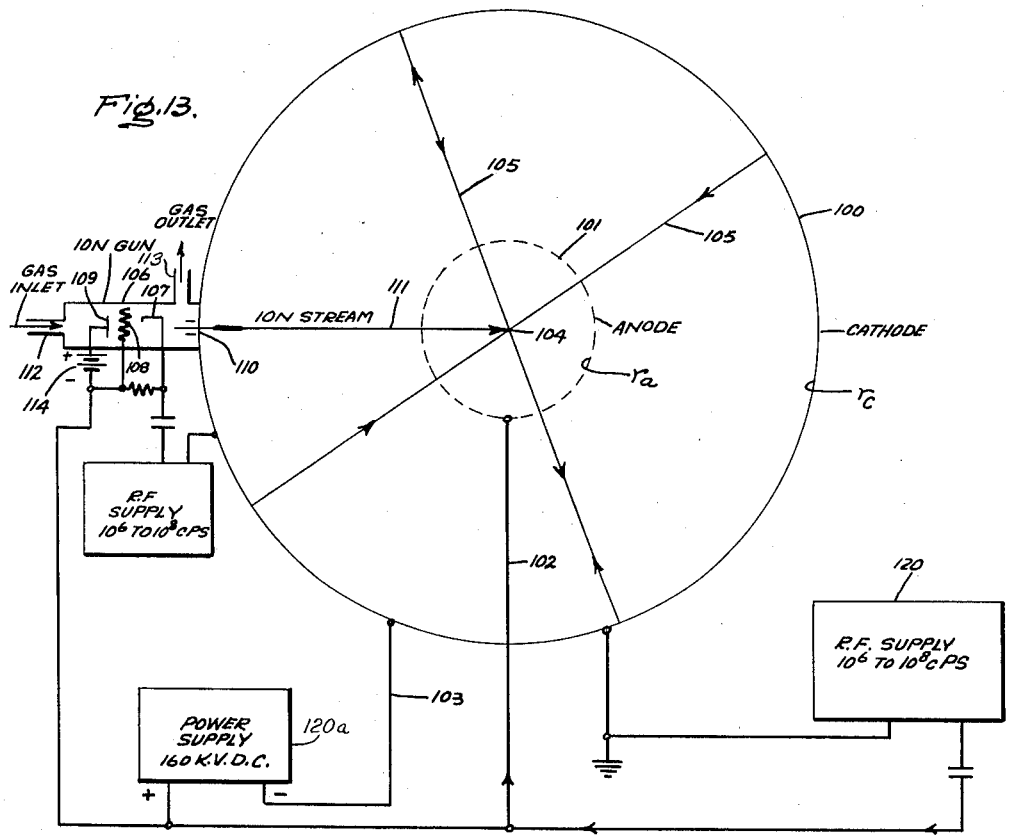
Figure 14:
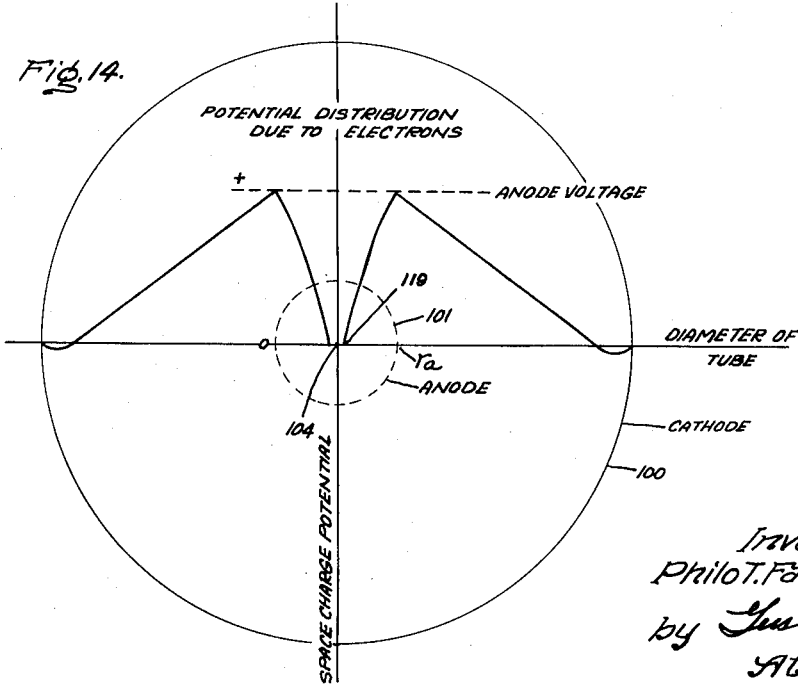
Figure 21:
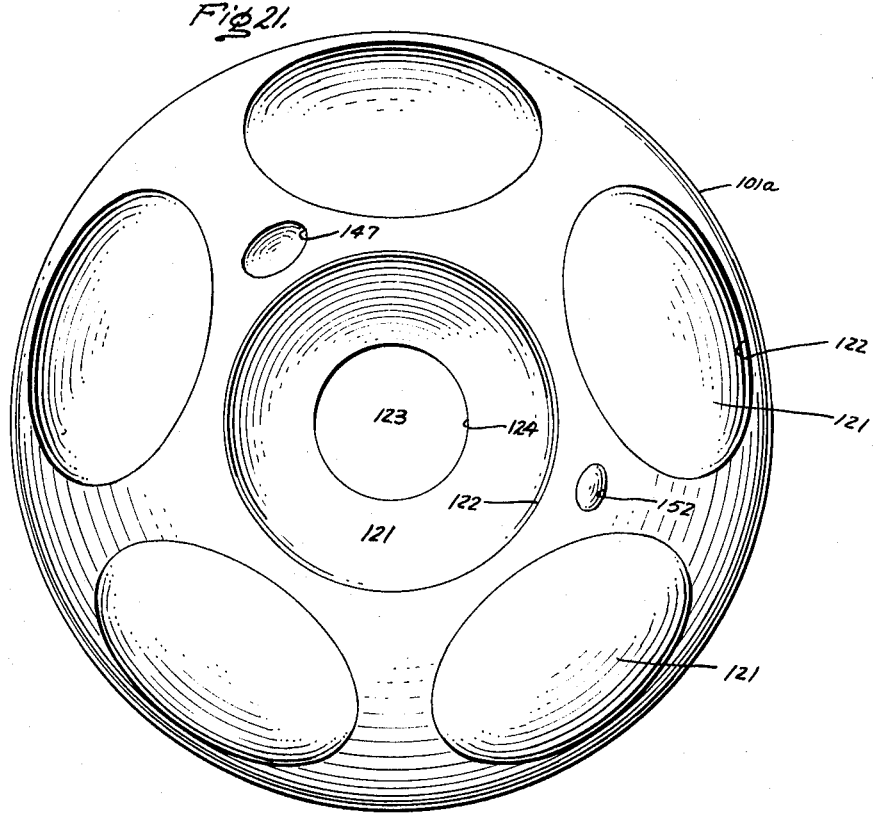
Figure 30:
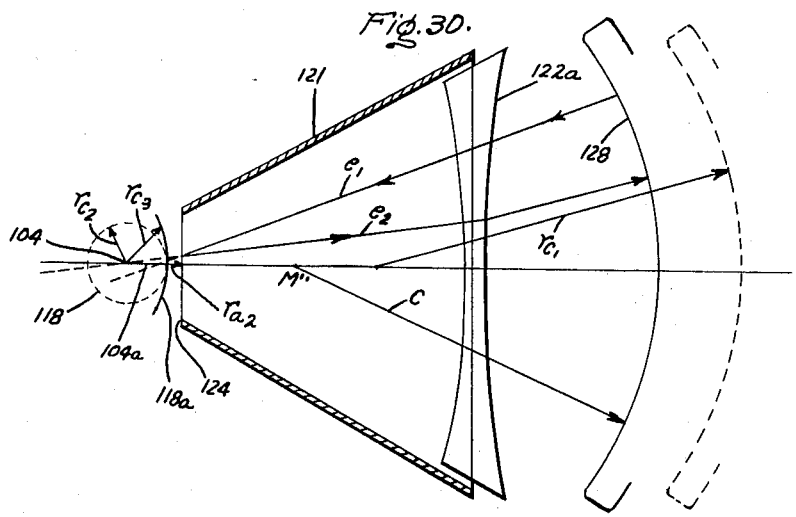
Figure 22:
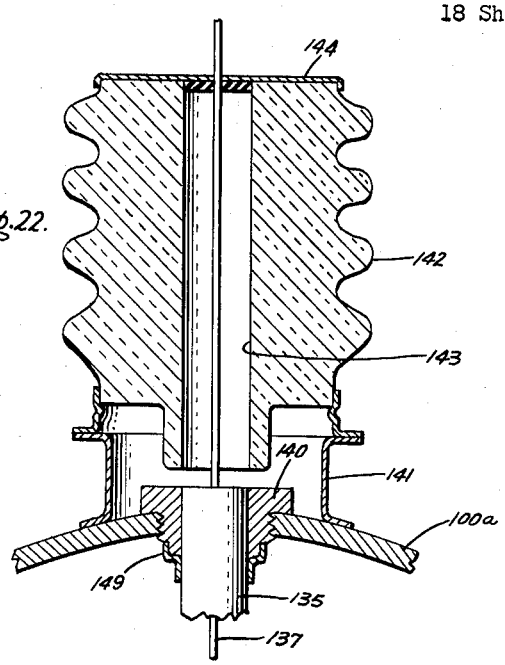
Figure 23:
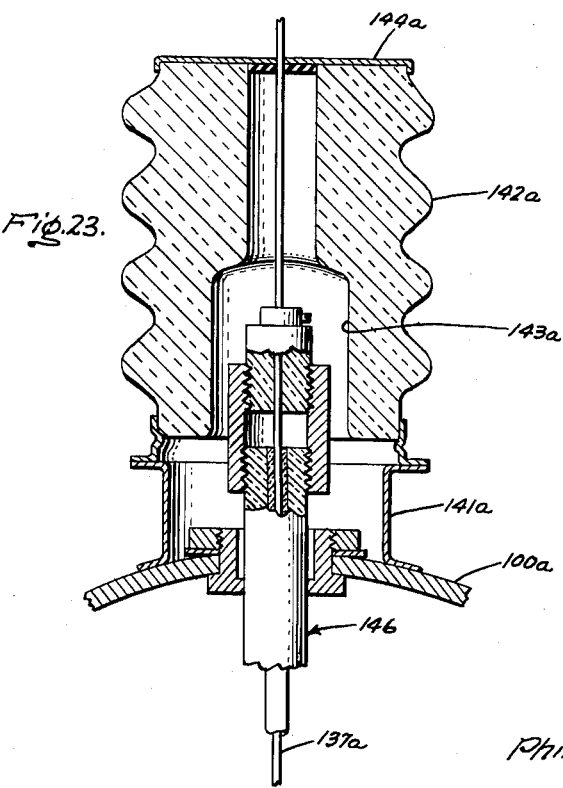
Figure 24:
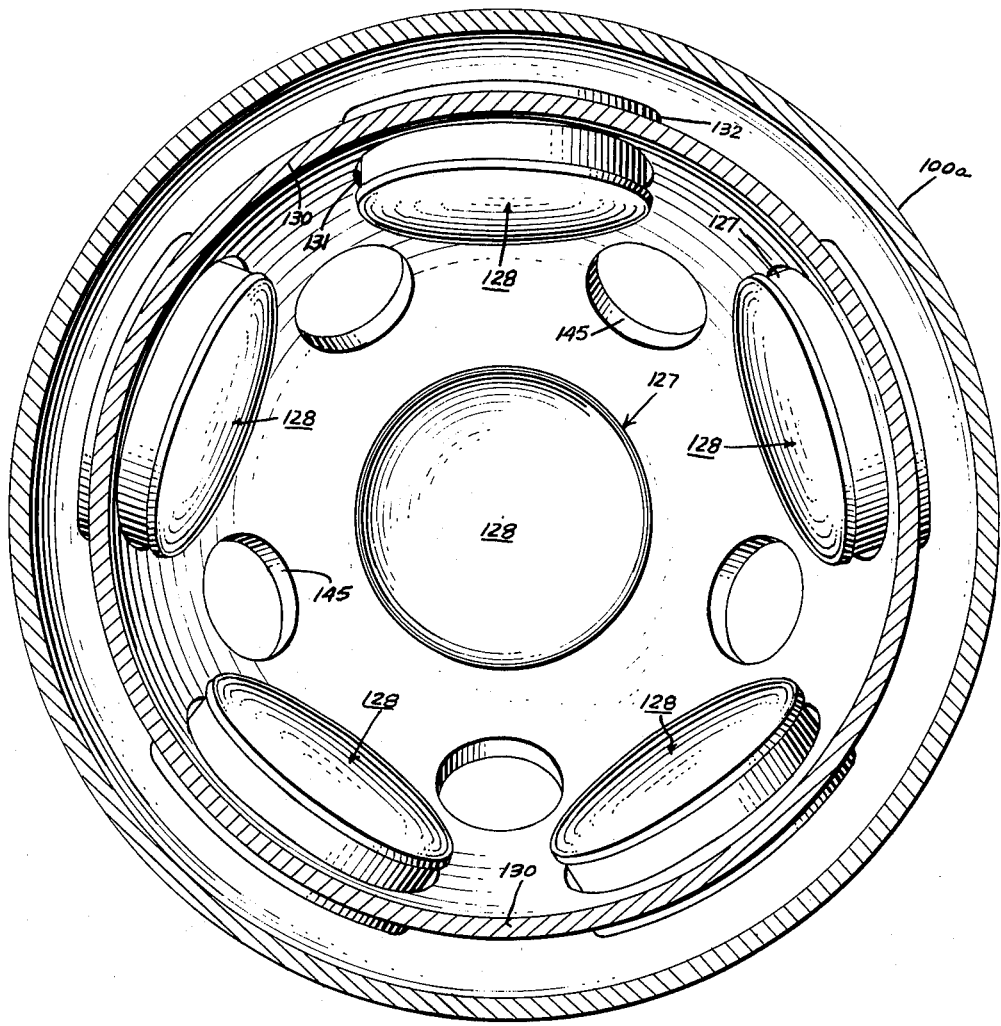
Figure 25:
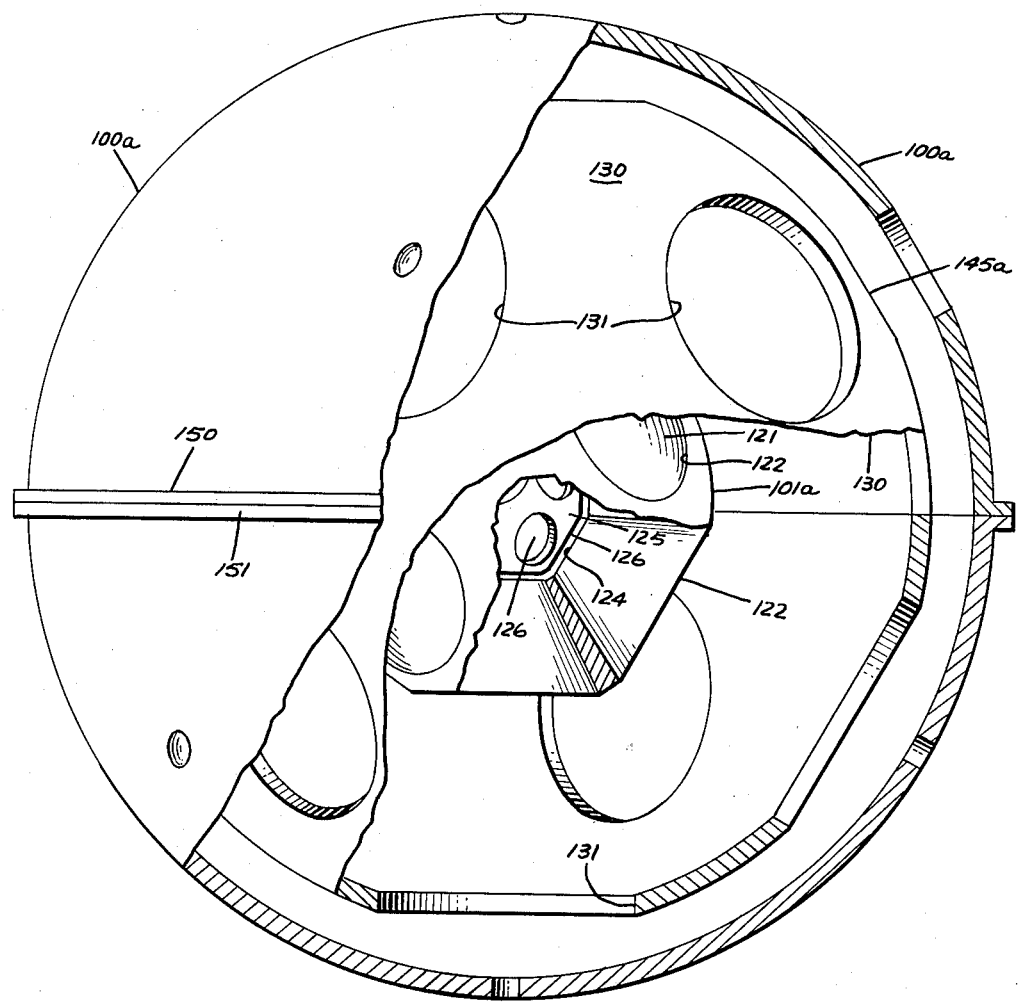
Figure 26:
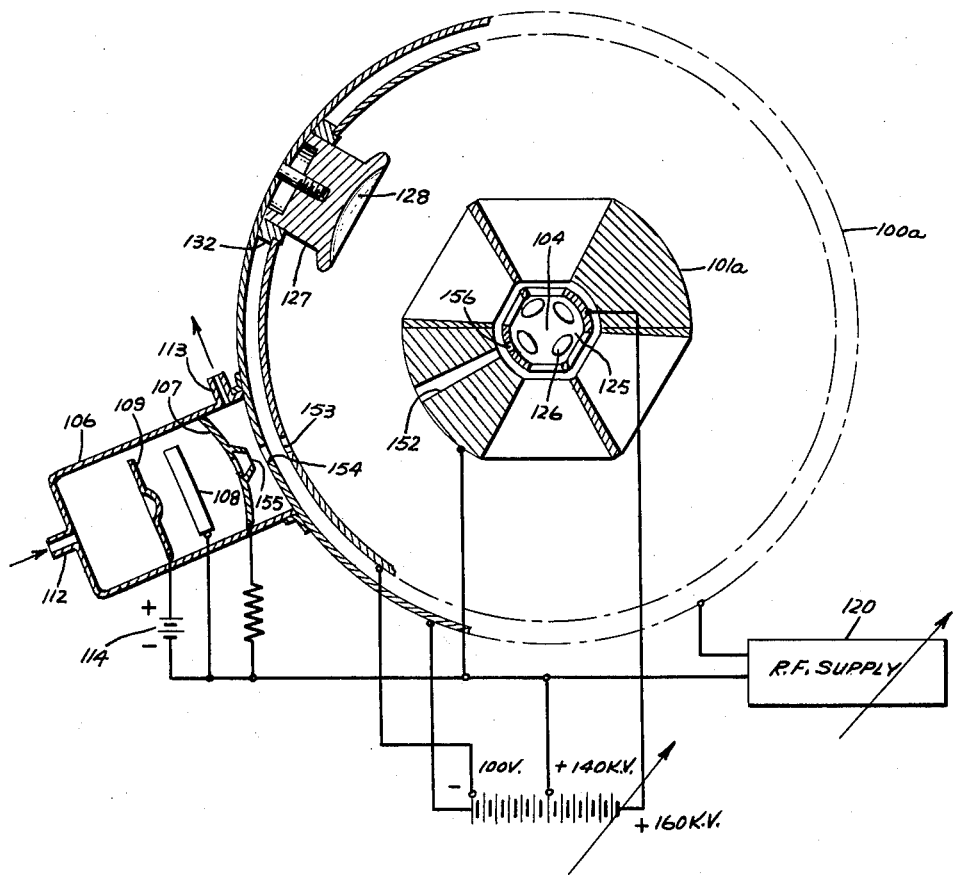
Figure 27:
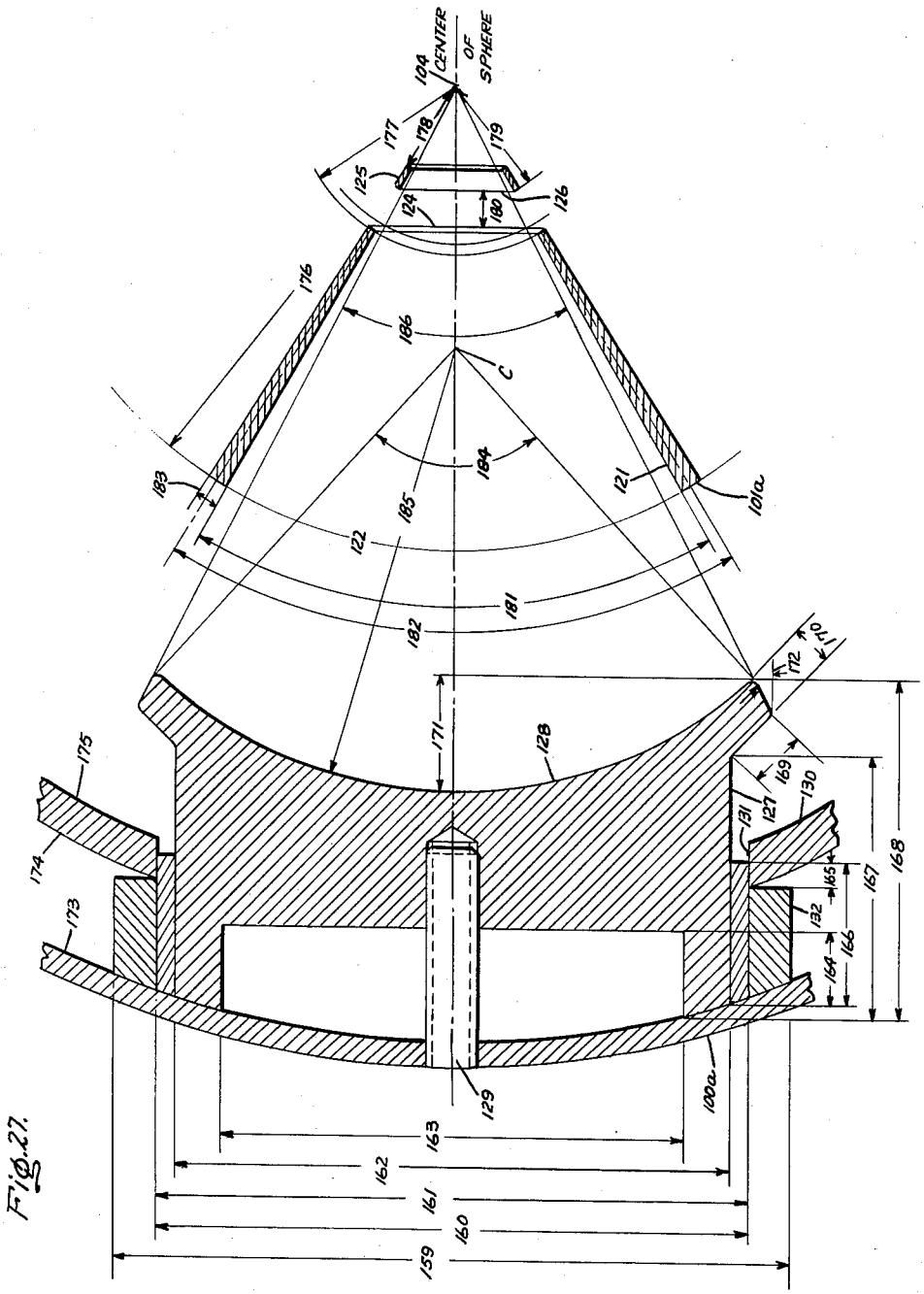
Figure 28:
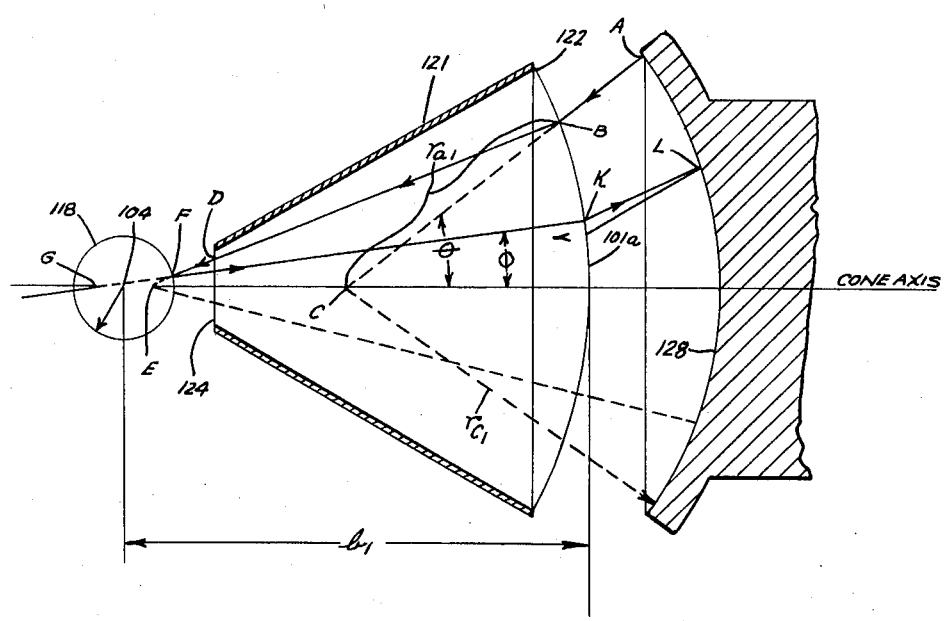
Figure 29:
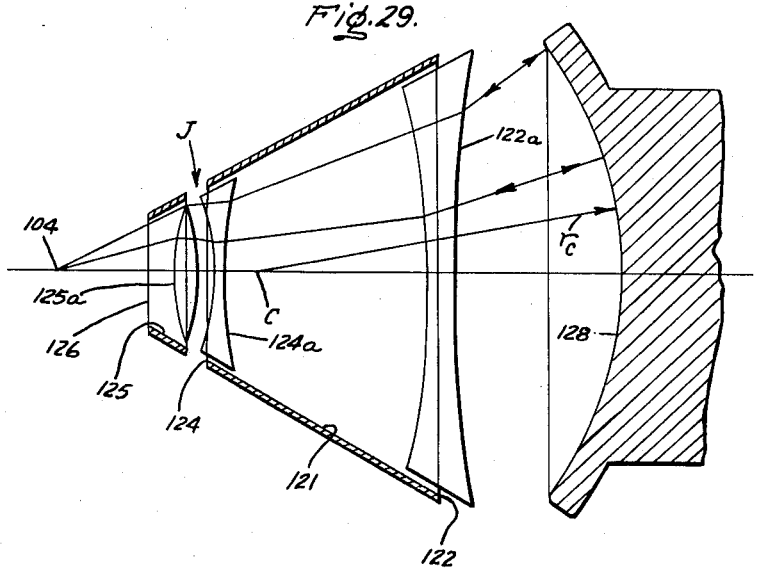
Figure 31:
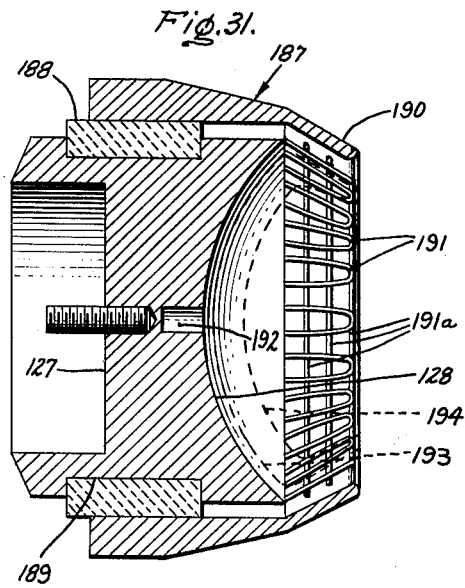
Figure 32:
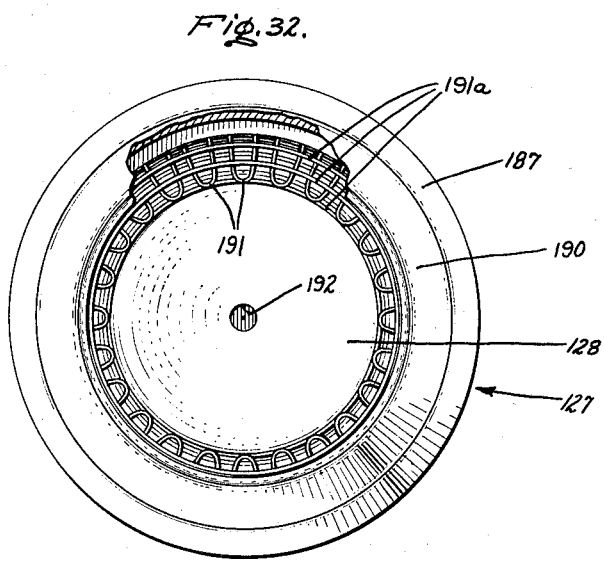

FIGS. 6a, 6b, and 6c are graphs used in explaining the operation of this system;

FIG. 7 is a schematic cross-section illustration of a complete system utilizing the device of FIG. 1;

FIG. 8 is a perspective illustration of a suitable anode construction;

FIG. 9 is a sectional illustration taken substantially along section line 9—9 of FIG. 8;

FIG. 10 is a cross-sectional view of another embodiment of this invention;

FIG. 11 is a schematic illustration of the device of FIG. 10 showing a plot of the equipotential surfaces produced at the anode;

FIG. 12 is an enlarged sectional view of the anode of FIG. 10;

FIG. 13 is a sectional view, in schematic form, of another embodiment of this invention;

FIG. 14 is a graph used in explaining the operation of the embodiment of FIG. 13;

FIG. 15 is an illustrative graph of the potential distribution within the tube of FIG. 13 due to the combined effects of both the ion and the electron discharge;

FIG. 16 is a curve similar to FIG. 15 of potential distribution inside the anodic space for one mode of operation;

FIG. 17 is a curve similar to that of FIG. 16 but illustrating a different mode of operation;

FIG. 18 is a diagram illustrating the principle of ion bunching in the anodic space;

FIG. 19 is a waveform used in achieving the ion bunching in FIG. 18;

FIG. 20 is a partial sectional illustration of another operating embodiment of this invention utilizing the principles associated with FIGS. 13–19, certain portions thereof being shown in section and others schematically;

FIG. 21 is an enlarged illustration of the anode of FIG. 20;

FIGS. 22 and 23 are partial sectional illustrations of the supports for the two anode elements used with the tube of FIG. 20;

FIG. 24 is a simplified hemispherical illustration of the basic tube structure of FIG. 20 with the anode element removed therefrom;

FIG. 25 is a fragmentary view of the tube of FIG. 20 partially broken away and sectioned and with the dynode elements removed for clarity;

FIG. 26 is a simplified sectional illustration of the tube of FIG. 20 showing the ion gun, the mechanical supports for the anode elements being omitted;

FIG. 27 is a fragmentary sectional illustration of one embodiment of the electron-optical assembly of FIG. 20;

FIG. 28 is a diagrammatic illustration of the electron optics shown in FIG. 27;

FIGS. 29 and 30 are diagrammatic illustrations of alternative forms of electron optics; and FIGS. 31 and 32 are sectional and front views, respectively, of an alternative collector construction.

*Electric field generation*

Referring to the drawings, and more particularly to FIG. 1, an evacuated spherical electron tube structure is shown which comprises a spherical cathode shell 20, a spherical anode shell 21, and an intermediate spherical control grid 22, these electrodes being concentrically arranged as shown. The anode 21 and control grid 22 are electron permeable and in this exemplification may be considered as open mesh electrodes. The anode may be the electrical equivalent of 99% open while the control grid may be 95% open. Suitable connections are made to these various electrodes, a lead 23 being connected to the anode 21, a wire 24 leading to the cathode 20, and a wire 25 leading to the control grid 22. Potentials of proper polarity and suitable parameters are applied as shown, the bias potential applied between the control grid and cathode 20 being such as to control electron flow from cathode to anode. The inner surface of the cathode 20 carries an electron-emitting material or apparatus.

With the cathode 20 supplying copious quantities of electrons, a cloud of electrons, or in other words a space charge, is developed in the space between the cathode and the negatively biased control grid. From this cloud, electrons permeate the control grid to oscillate through the tube until captured or intercepted by the anode. Any electrons which may happen to pass back through the control grid will re-enter the electron cloud and thereby not be lost.

With suitable potentials applied to the electrodes, electrons emitted by the cathode surface converge along essentially radial paths toward the center of the tube. Electron flow is accelerated toward the anode by reason of the electric field established between the anode and cathode so that when the electrons reach the vicinity of the anode, they are travelling at high velocity. Inasmuch as the anode is an essentially open structure, in one embodiment being 99% open, the anode itself may be considered as a spherical equipotential electron-permeable surface which exerts an accelerating force on the electrons emitted by the cathode. Upon reaching the anode surface, the electrons will have a velocity corresponding to the potential through which they have fallen and will thereupon travel onwardly, along the same radial paths, toward the geometric center of the anode.

If at this point only a single electron is considered as existing in the space inside the control grid, this electron will travel diametrically through the control grid space as well as the anode space. Because of the potential differential between the control grid and the anode, the velocity of the electron will be affected correspondingly, but because of the fact that the potential inside the anode is uniform, that is to say, constant throughout the anodic space which is free of tangible structure, the electron will experience no velocity-changing force while travelling therethrough. Thus, the electron, upon entering the control grid space, oscillates diametrically across the tube inside the control grid, the electron being considered as starting its travel at or near a given point on the control grid, accelerating toward the anode, traveling with constant velocity through the anode space (which may be characterized as a volume of free space), and then decelerating from the anode to the control grid, the velocity of the electron just before reaching the control grid being zero. This electron will continue its oscillatory travel until it is intercepted by the anode, it being desired that the electron make as great a number of trips as possible before being so lost.

The significance of this single-electron consideration is two-fold, the first recognizing that the normal space potential inside anode 21 is uniform at the value of the anode potential, whereupon an electron travelling across the anodic space does so with uniform velocity and energy, and the second being that the electron oscillates within the space of the control grid a relatively large number of times before it is lost by anode interception.

As the next step in considering tube operation, let it be supposed that only two electrons simultaneously start movement from diametrically opposite points on the control grid. Both of these electrons will be propelled radially toward the exact center of the anodic space so that these electrons will collide at the exact center 26 in the absence of any mutually repelling forces. Inasmuch as the two electrons are negatively charged particles, they will exert mutually repelling forces on each other the moment the anodic space is penetrated so that their respective velocities will progressively decrease until the electrons very nearly touch at the exact center 26. At this point, their respective velocities drop to zero. However, in a practical embodiment the approach of the electrons is not "head-on," whereupon they pass each other at minimum velocity rather than stopping. Upon passing each other, the electrons are accelerated outwardly by the mutually repelling forces thereof. Upon leaving the anode, continued return movement results in the electrons losing velocity until they stop adjacent the control grid, whereupon the cycle is repeated.

It may now be noted that, even though the unipotential space inside the sphere 21 exerts no force on a single electron passing therethrough, two electrons approaching each other along a diametral path experience coulomb repulsion and velocity change which serves to create an electric field in the anodic space. This may be thought of as a space charge effect.

Now assuming that a copious quantity of electrons emitted from the cathode permeates the control grid, such electrons will follow diametral paths indicated by the arrows 27 which cross near the center. These electrons will converge toward the center 26 at progressively decreasing velocities until they reach a minimum velocity and thereafter diverge outwardly along essentially the same diameters, accelerating until they pass out through the anode surface 21. As the electrons pass through the interior of the anode 21, they contribute a negative charge to the anodic space so as to progressively decrease the space potential as the center is approached. Thus, at the anodic center a virtual cathode will be produced which can be made to have a potential essentially the same as that of the cathode 20. The total space current (including both inward and outward flow) that is needed to establish the virtual cathode at the center of the anodic space for typical embodiment of this invention is 1500 amperes for an anode potential of 100 kilovolts. This can be shown by calculations based on formulae such as those developed by Langmuir and Blodgett for similar geometries (see Physical Review, vol. 24, p. 53, July 1924). The space current generated in this invention oscillates back and forth through the permeable anode since it does not re-enter the cathode from which it was emitted. It builds up to values much higher than the anode current because the permeance of the anode allows the interception of only a very small fraction of the space current. The instantaneous space current, including both inward and outward flow, is related to the cathode current by the following series:

(1)
$$I_{space} = I_{cathode} \sum_{0}^{k} P^k$$

where "P" is the decimal expressing the ratio of open anode area to total anode area and "k" is the number of trips through the anode in both directions made by an electron which started from the cathode at time zero. The variation in space current with time may be found by determining the electron transit time "t" for an electron between its inner and outer limits of travel since this determines how often it passes the anode. Then the current at a specified time "T" is determined by substituting $$K = \frac{T}{t}$$

in Equation 1 above. The relation between the anode current and cathode current is the following:

(2)
$$I_{anode} = I_{cathode} (1-P) \sum_{0}^{k} P^k$$

From 1 and 2 it is clear that (3) $I_{anode} = I_{space}$ times $(1-P)$

Thus the actual space current in the tube is many times greater than the anode current by a factor corresponding to the reciprocal of the quantity of one minus the effective anode openness "P." For the previous given effective anode openness of 99%, this factor is 100, giving an anode current of 15 amperes for the 1500 ampere space current requirement above.

The establishment of the space charge inside the anode may be better understood by reference to the graph of FIG. 2 wherein the abscissa represents the diameter of the tube and the ordinate represents the potential distribution inside the tube. Inasmuch as the magnitude of the space charge is dependent upon the amount of space current flowing in the anodic space, the different curves of the graph illustrate the potential of the center 26 for different quantities of current. For a minute quantity of current, it will be seen that the negative charge contribution will reduce the potential at the center according to the curve $(a)$. A larger current will produce a potential distribution according to curve $(b)$, which makes the center more negative. Progressively higher currents produce more pronounced curves $(c)$, $(d)$ and $(e)$, curve $(d)$ representing the preferred operating condition of nearly zero potential at the center, or in other words a center potential slightly positive with respect to the cathode 20. It will be understood that these curves $(a)$ through $(e)$ are representative only to illustrate the fact that intense electron densities at the anodic center 26 are required to drive the potential thereof to the desired value.

Still considering this set of curves, the potential distribution across the entire diameter of the tube due to electrons only starts from zero at the cathode, decreases slightly between the cathode and the grid, and then increases toward the anode potential, while inside the anode sphere 21 it again diminishes to nearly zero at the center 26. This potential distribution has spherical symmetry.

It may now be appreciated that it is possible without any physical means other than space current flow to produce a non-uniform potential distribution in a space enclosed by a permeable equipotential surface (anode 21).

*Ion generation*

Having explained the basic electronic features of this invention, the next phase of the tube construction and operation will be considered.

This involves the creation inside the anode space of positively charged ions which are controlled in such a manner as to produce a nuclear reaction.

Referring to FIG. 3, like numerals will indicate like parts. A tubular element 28 opens into the interior of the tube through a suitable conductive screen 29. A window or suitable radiation filter 30 is secured over the end of the element 28 to permit viewing ultraviolet or other radiation emitted from the interior of the tube. Laterally extending from the element 28 is an exhaust tubulation 31 which is coupled to a suitable vacuum pump 32 (see FIG. 7). It may be stated at this point that the tube is evacuated by operation of a vacuum pump 32 and associated valving, this vacuum pump being operated continuously or intermittently as needed to achieve the desired operation which will become more apparent from the following description.

It may now be generalized that the anode 21 is supported in the exact center of the cathode 20 by means of a supporting structure comprising a metallic gas inlet tube 33 and a suitable insulator 34. The material forming the tubular element 33 must be able to withstand high temperatures, as is true of the insulator 34. Still further, the tubular element 33 is used to conduct the anode potential to the anode.

As was explained earlier, the cathode 20 is called upon to emit copious quantities of electrons. Preferably, cathode 20 comprises a photoelectric material which may be excited by intense ultraviolet radiation. Under intense ultraviolet radiation, it has been found that aluminum or germanium is photoelectric; therefore, the cathode 20 as well as the supporting structure may consist of aluminum. Still further, to obtain better out-gassing during evacuation, the cathode 20 may be constructed of copper with the electron-emitting surface being coated with a photoelectric material, such as aluminum or germanium, which will emit copious quantities of electrons in response to ultraviolet excitation.

The purpose of the tubular element 28 and window 30 is to permit viewing of the interior of the tube during operation. As will be explained more fully in the following, once the tube becomes fully operative, it will generate its own ultraviolet excitation at or near the center 26, which will serve to produce electron emission from the cathode.

While certain specific design information and details will be given in the following, it is to be understood that this invention is not limited thereto, and that such design details and information are given only for the purpose of describing more clearly and fully the construction and operation of the invention. It will occur as obvious to a person skilled in the art that these design details may be modified in order to secure different performance characteristics; however, these modifications can be made without departing from the scope of this invention as defined by the appended claims.

The order of vacuum which the pump 32 (FIG. 7) must develop is a pressure of $10^{-6}$ to $10^{-7}$ millimeters of mercury in order to permit good outgassing and to insure that inleakage is low so that contaminants will be at a minimum. However, it should be understood at this point that while the pump 32 (FIG. 7) is required to develop this vacuum, the tube will actually be operated at a much higher pressure.

By means of the inlet tube 33 or alternative inlet means small quantities of suitable gasses such as hydrogen, deuterium, tritium, or the like are admitted to the interior of the tube. While different gas pressures may be used, one type of tube operation is achieved by allowing sufficient gas to enter the tube as will raise the pressure to about $10^{-4}$ millimeters of mercury. Of course, the exact pressure will depend upon preferred design characteristics. The pump 32 and associated valving (FIG. 7) is operated in such a manner as to hold this particular degree of vacuum or pressure.

As gas atoms diffuse into the anode 21 and into the paths of the converging electrons, collision of the electrons with the neutral atoms results in positive ion formation. As was explained in connection with FIGS. 1 and 2, there exists a potential distribution inside the anode 21 of nearly zero potential at the center 26 and maximum positive potential at the surface of the anode 21. Thus the positive ions will be attracted toward the center 26 and will attain a maximum velocity corresponding to the potential through which they fall in passing from the point where they are born to the center 26. FIG. 4 is a cross-sectional illustration of the anode 21 only, with the character of ion concentration being indicated by stippling.

If it is assumed that an ion is born or created in that part of the anodic space where the potential difference with respect to center 26 is 50 kilovolts, then the ion will be attracted toward the center. In its flight toward the center, the ion will gain sufficient momentum to carry it beyond the exact center, after which the flight will diminish in velocity until the ion reaches a point in space which again has a potential difference with respect to the center 26 of about 50 kilovolts. The ion will there experience a force of repulsion which will cause it to return toward and through the center again. From this it will be seen that an ion born at some point in space having a potential positive with respect to the center 26 will oscillate along radial paths through the center 26, the length of the oscillating path being determined by the space potential at which the ion was born.

The ions born in the regions adjacent the anode surface 21 will fly toward the zero potential center 26 with extremely high acceleration and velocity and will travel through along a diametral path to the opposite point of the anodic space until the original energy level is attained. Then they return toward the center and repeat this oscillatory transit the same as those ions born near the center. This ion movement is graphically illustrated by means of double-ended arrows in FIG. 4 wherein the arrow 35 indicates the oscillatory path followed by an ion born near the anode surface 21, the arrow 36 indicating the oscillatory path followed by an ion born closer to the center and, lastly, the arrow 37 indicating the oscillatory path followed by ions born adjacent the center 26. All of these ions, since they pass through the center, contribute to the high ion-density which develops therein. However, by far the largest contribution to this ion density is attributable to those ions possessing an energy in excess of 30,000 electron volts. In a typical embodiment of the invention these ions can exceed 95% of the total. The space of heavy ion concentration can have a radius as small as one (1) millimeter. Certain of the slowly moving ions will recombine with an electron near the center 26 and thereby reduce to a neutral atom which experiences no force of movement. Such atoms will tend to drift outwardly and either will be reionized with probability of reappearance of ions of higher energy or will escape from the anodic space and be lost. It is important to avoid reionization of neutralized ions since this will result either in loss of average ion energy or loss from radiation. This is accomplished by utilizing a potential distribution similar to curve "e" of FIG. 2 in which the electrons near the center have insufficient energy to produce appreciable ionization. The proper choice of curve "e" as against curves "d" or "c," for example, is obtained by adjusting the control grid 22 bias. Other slow ions will receive energy from fast ions producing two intermediate velocity ions which are then converted into high energy ions as is explained more fully hereafter. Thus the slow moving ions are effectively scavenged from the center, leaving a high percentage (95%, as previously mentioned) of high energy ions contributing to the center 26 density. Particle concentration inside the anode is graphically illustrated by the curves of FIG. 5, the ion density being represented by the two curves 38.

Figure 2A:
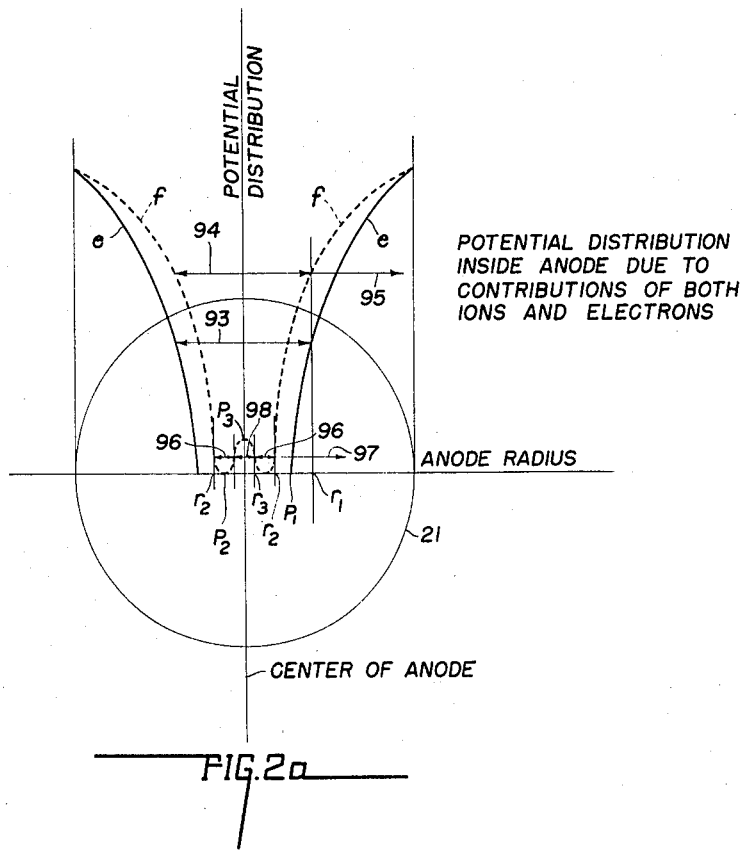
FIG. 2a is a graph similar to FIG. 2 used in explaining the operation of the invention.

The ion motion described thus far was based on a potential distribution near the center of the device, which was derived on the assumption that only electrons are present. This distribution will be somewhat affected by the presence of the ions. In FIG. 2a, curve "e" is the potential curve from FIG. 2, in the absence of ions. Curve "f" shows the actual potential curve as resulting from the combined negative electron and positive ion space charges. It is seen that the point $P_1$ where the electrons reach their lowest velocity, shifts inwardly toward $P_2$ and that in the space between $P_2$ and the center, the potential increases to a maximum of $P_3$.

Take now an ion born at radius $r_1$ in FIG. 2a. If only electrons were present, it would oscillate through the center of the anodic space for the distance corresponding to the length of double arrow 93. With the corrected potential curve "f," the ion will oscillate through the center for the distance corresponding to the double arrow 94. This motion, generally speaking, is at a higher energy level than that along arrow 93 which is a favorable effect. Simultaneously with the birth of this ion, an electron will be born moving outwardly from the center (arrow 95).

Next, take an ion born at $r_2$ or $r_3$. Its oscillation path through the anodic center is indicated by double arrow 96. If the ion originates at $r_2$, there will also be an electron generated, moving outward as indicated by arrow 97. If, however, $r_3$ is the point where both the ion and the electron are born, the electron will locally oscillate through the center, as shown by the double arrow 98.

This latter group of electrons which oscillate locally through the center will counteract the positive space charge generated by the ions, because they reduce the potential hump $P_3$ at the center. This is desirable, because the phenomenon increases the energy of high velocity ions (along arrow 94) which are the ones which initiate the desired nuclear reaction, as described later. It also permits a greater ion density at the center.

The exact quantitative relations will depend on the position of point $P_1$ which is determined by the original electron current and can therefore be controlled, e.g., by the bias of control grid 22.

Since the space adjacent to and surrounding the anode center, indicated by the symbol $P_2$, is a relative potential minimum, this space or region is characterized as a virtual cathode. Similarly, since the central point $P_3$ is a relative potential maximum with respect to the potentials in the center of the anode, it may be termed a virtual anode. Either of these (virtual cathode and virtual anode) may be designated a "virtual electrode."

The ion transit time, that is, the time which an ion takes for one traversal of its path, is proportional to the ion path length and inversely proportional to its velocity. In FIG. 4, path 35 corresponds to the higher ion velocity but this path is also longer than the other paths (36, 37). Calculations show that the transit time of the higher energy ion following path 35 is larger than the transit time of lower energy ions such as the ones following the paths 36 and 37. However, the differences in transit times for ions of different energies are not large for the interval from about 30,000 electron volts to 100,000 electron volts.

As has already been explained, the high energy ion will oscillate radially through the anodic space. This oscillatory action will continue until one of three possibilities occurs:

(1) The ion path is changed by the "scattering process";

(2) The ion "captures" an electron and becomes a neutral atom; or (3) The ion is absorbed by a nuclear reaction.

By "scattering process" is meant the phenomenon of the forces of repulsion experienced by two ions approaching each other from different directions. For example, assuming that one ion is stationary at the center 26 and another ion is travelling radially inwardly toward this central ion, as the travelling ion approaches the center it will experience a coulomb force of repulsion which will tend to set the central ion into motion and to reduce the velocity of the incident ion. Thus, an energy transfer occurs from the moving ion to the stationary ion, which tends to slow down the moving ion. The net effect is that instead of a fast ion and one at rest, two ions of intermediate velocities are produced. Average energy transfer per encounter is very small, but finally the condition of equi-partition of energy between the particles will be approached.

In the case of "capture," an ion gains an electron from a neutral atom which becomes an ion of lower energy than the original ion. This leaves the total number of ions unchanged. This ion must then be accelerated to a higher energy as in the case mentioned above. A nuclear reaction on the other hand will usually remove two ions, which, of course, must be replaced.

In order to increase the probability of the occurrence of nuclear reactions, it is preferable to maintain the oscillatory flight of the high speed incident ions. This means, then that when an incident ion loses energy upon passing through the center, this energy must be restored.

In order to maintain projectile oscillation, the control grid 22 is modulated for the purpose of varying periodically the space charge potential of the anodic center 26 with respect to the anode 21. The modulating signal is preferably a sine wave having a frequency whose period is slightly greater than the transit or flight time of the ionic particle (projectile) in its travel from one side of the anodic space to the other. FIG. 6a is illustrative of the sine wave modulation which is applied to the control grid 22. This modulation will vary periodically the intensity of the space current converging on the center 26 and will thereupon modulate the potential of this center 26 with respect to the anode 21 as shown in 6b. This center 26 modulation is illustrated in FIG. 6c (similar to FIG. 2 by the dashed line portion 40 of curve (d)) whereby it is shown that the center 26 periodically varies from a potential near zero volts (curve "d") to a slightly higher potential (curve 40). The limits of this potential variation may be adjusted by means of the grid bias and the modulation amplitude controls.

As a result of this modulation, projectile ions whose transit time is greater than the modulation period will have energy imparted thereto of a reinforcing nature, thereby maintaining their state of oscillation. Ions whose transit times are shorter than the modulation period will lose energy and drop to a longer transit time. It will now appear that the frequency of the modulation is important with two criteria setting the upper and lower frequency limits respectively. The upper frequency limit is determined by the highest ion energy desired. The lower frequency limit is set by the need for preventing ion escape from the anodic space. Preferably the actual frequency is adjusted to fall within these limits.

As will be recalled, a high speed, projectile ion loses an increment of energy upon passing through the anodic center by reason of the "scattering process" described previously. If this particular ion has a transit time shorter than the modulation period, this increment of energy will be restored, whereupon the projectile will continue its oscillatory flight with increasing amplitude and velocity. As a consequence, the ion exists for a greater length of time with greater probability of producing a nuclear reaction.

*Nuclear reaction*

If any oscillatory ion should collide with another ion with suitable energy, a nuclear reaction will be produced. There are a very great number of nuclear reactions which are possible. Fusion reactions of an exothermic nature will be specifically considered as one type of reaction which this invention seeks to attain. Power production by such reactions is theoretically proportional to both the amount of energy, Q, released per reaction and the number of reactions taking place per unit time. The number of reactions per unit time is obtained by taking the product of the nuclear cross-section, which expresses the probability for a specific nuclear reaction to occur, the number of ions in the center region 26, and the number of projectile particles passing through this region per unit time. The nuclear cross-section or the probability that a nuclear reaction will occur is a function of the velocity or energy of the projectile particle which in this device is a function of the potential difference between the maximum point of outward travel by the projectile and the center 26. From the above, it is clear that good power-producing reactions require a large nuclear cross-section and also a large Q or reaction energy release.

One reaction which theoretically is outstanding in meeting the above requirements is the tritium reaction with deuterium. The nuclear equation for the process is as follows:

(4) $\quad _1H^3 + {_1}H^2 + E_p \rightarrow {_2}He^4 + {_0}n^1 + (Q + E_p)$

This states that a triton plus a deuteron plus the sum of their kinetic energies, $E_p$, results in a nuclear reaction whose products are helium 4, a neutron, and the sum of the reaction energy released, Q, and the kinetic energy, $E_p$, possessed by the original triton and deuteron. The reaction energy release, $Q$, is 17.6 mev. for the example above. This Q value is large compared with the Q values for other possible reactions which in most cases are 3 or 4 million electron volts (mev.). The nuclear cross-section for the reaction shown in 4 peaks at a value of about $5 \times 10^{-24}$ cm.$^2$ for projectile energies of 100 kilo-electron volts (kev.). This cross-section value is about $10^2$ times larger than that for most competing reactions when compared at the same projectile energies.

Additional possible reactions are the following:

(5) $\quad _1H^2 + _1H^2 \rightarrow _0n^1 + _2He^3 + 3.3$ mev.
(6) $\quad _1H^2 + _1H^2 \rightarrow _1H^1 + _1H^3 + 4.0$ mev.
(7) $\quad _2He^3 + _1H^2 \rightarrow _1H^1 + _2He^4 + 18.3$ mev.

Reactions 5 and 6 have a lower Q value and a lower 100 kev. cross-section value than reaction 4. Reaction 7 has about the same Q value but a lower 100 kev. cross-section value, making it second in preference to reaction 4.

Power generation

Referring to FIG. 7, the devices of FIGS. 1 and 3 are shown incorporated in a system for producing power. When a suitable anode potential is applied, the current emitted by the cathode 20 is eventually intercepted by the anode, as explained hereinbefore. This current can range as high as 20 amperes with an applied anode potential of 120 kilovolts. The high temperatures produced at the anode by the interception of this current must be dissipated sufficiently rapidly. A heat exchange unit for this purpose is illustrated in FIG. 7 as comprising a spherical water tank 47 in intimate thermal contact with the outer surface of the cathode 20. Enclosing the heat exchange unit 47 is a biological safety shield 48 which may comprise any of the well-known shield materials lead, water, or concrete. A suitable source 49 of gas is connected to the inlet pipe 33 and a power supply 50 is connected between the anode and cathode. A source 51 of modulating voltage and bias is coupled to the control grid 22 for developing the modulated space current previously discussed.

By use of suitable material in the heat exchanger, the heat developed inside the tube may be quickly conducted away and, further, the energy of the reactant products or particles may be transformed by the heat exchanger into heat which is then utilized in a conventional manner to produce power. The above energy of the reactant products will be released in the form of kinetic energy stored in the fusion products, which are alpha particles and neutrons. The total energy, $Q + E_p$, (as defined previously), will be about 17.7 mev. and will divide between the alpha particle and neutron inversely as their mass ratio. The alpha will then have an average energy of 3.5 mev. and the neutron an average energy of 14.2 mev. The 3.5 mev. alpha will transfer most of its energy to the tube electrodes where the energy is transformed to heat, that is, in turn, radiated and conducted to the heat exchanger surrounding the tube. The 14.2 mev. neutron will leave the tube and penetrate into the liquid of the heat exchanger. The liquid is selected not only for its efficiency in heat removal, but also for its ability to absorb the neutron's energy as heat. A hydrogenous material or moderator is best suited to absorb the neutron's energy. Light water is especially good for it absorbs the neutrons after moderating their energy, thus giving some shielding effect as well as resulting in the production of heavy water. Heavy water is a good moderator without the large neutron absorption characteristic of light water. The heavy water would be used where it is desirable to produce large quantities of thermal energy neutrons which could be used in conjunction with $_3Li^6$ (lithium-six) to produce tritium with additional thermal energy output as well.

In FIG. 8 is illustrated one form of construction for the anode 21, the preferred material being tungsten and the construction consisting primarily of suitably thin crossed vanes in the form of discs having central apertures punched therein. One particular anode structure is 4 centimeters outside diameter and 2 centimeters inside diameter. Inside diameter for the cathode is 12.7 cm. and that for the control grid is about 12 cm. It will obviously appear that these dimensions may be altered in order to achieve different performance characteristics.

The insulator 34 of FIG. 3 preferably is made of high resistivity aluminum oxide (alumina) of non-porous variety which is capable of contributing to a tight vacuum seal for the tube. As just explained, the anode material is tungsten, this being necessary to withstand the relatively high temperatures generated by anode dissipation, these temperatures ranging as high as 2000° C. The control grid 22 may comprise a gold-plated perforated metal shell which is 95% open and which produces at the most only negligible electron emission. The cathode 20 may be composed of hydroformed hemispherical cups of copper to provide a spherical wall which may be covered with suitable photoelectric material, such as aluminum or germanium, capable of emitting copious quantities of electrons under intense ultraviolet radiation.

The power supply should deliver about 100 kilovolts direct current, e.g., while the control grid bias should be adjusted to the best operating value between plus and minus five (5) volts. The radio frequency supply should deliver about ten (10) volts plus or minus 5 volts in the vicinity of $10^8$ cycles per second.

Summary of operation

At the moment the power supply 50 (see FIG. 7) is turned on, there will be some stray electrons emitted from the cathode 20. This results in the production of a limited number of ions which, in the generation thereof, release a number of secondary electrons by cathode bombardment to produce additional ions. This process is cumulative until the virtual cathode is formed which appears as a tiny spot of light. Ultraviolet radiation resulting from recombination of ions serves to excite further electron emission from the cathode 20. This latter process becomes the major factor in maintaining the electron discharge. Following the establishment of the virtual cathode 20, the resulting ion interaction produces nuclear reactions. The nuclear reactions may serve as a source of power or alternatively the radiations accompanying them may be used for other purposes.

Second embodiment

Considering for the moment the first embodiment of this invention as illustrated in FIGS. 1 and 7, for example, it will be seen that the edges of the anode structure 21 lie in the path of the converging space current. Therefore, there cannot be avoided some interception of this space current which can be appreciable, resulting in a relatively high energy loss as well as the production of extremely high temperatures in the anode. In the second embodiment of this invention as illustrated in FIGS. 10 and 11, a structuer is provided which reduces to a minimum or almost completely eliminates anode interception of space current, thereby avoiding the aforementioned high energy loss as well as the production of high anode temperatures as a result of such energy loss.

The structure of FIG. 10 is fundamentally the same as that of the first embodiment of FIG. 1. Hence, wherever possible, the same reference numerals will be used with the only difference being the addition of a suffix "$a$".

The tube comprises a spherical cathode 20a formed of two hemispherical sections of copper or aluminum which are suitably fastened together in vacuum-tight relation. The control grid 22a is of spherical configuration but having two segments removed from opposite sides, respectively, which are reinforced by two metallic rings 52 and 53, respectively. Suitable stand-off insulators 54 and 55 are secured between the cathode and ring 52 for supporting the grid concentrically inside the cathode. Metallic screen material of 95% openness constitutes the grid.

In the central portion of the tube is disposed the anode 21a which is composed of two symmetrically arranged anode sections 56. Since these anode sections are identical in construction, the specific description of one will suffice for both. Each section is composed of three spaced-apart cup-shaped tungsten elements having essentially a spherical curvature about the tube center 26a. The inner cup 57 is mechanically supported by the outer cup 58 by means of suitable conductive connectors 59 which pass through clearance openings 60 in the middle cup 61. The clearance openings 60 are of such size that an insulating gap is provided between the connectors 59 and the middle cup 61.

A sleeve 62 supports the outer cup 58 and is suitably secured to the inner end of a feed-through insulator 63 which extends radially outwardly from the tube. A longitudinal bore 64 in this insulator 63 receives a coaxial conductor composed of an outer conductive sheath 65, an inner conductor 66 and a suitable insulator 67. The sheath 65 is connected to a sleeve 68 which supports the anode cup element 61. The inner conductor 66 flares outwardly at its inner end for connection to the inner cup 57. It should be noted that the connection between this cup 57 and the inner conductor 66 should be such as to provide suitably rapid conduction of heat from the cup 57.

The relative size and position of the anode cup elements are as illustrated in FIG. 10, the edges of the cups terminating substantially along the imaginary crossed diameters 69 and 70. In connection with this it should be noted that the two grid-reinforcing rings 52 and 53 comprise, in cross-section, two flanges, the flange 71 being substantially parallel to the cathode 20a surface and the flange 72 being part of a conical surface. The purpose and importance of this configuration will be explained more fully hereafter.

Hermetically sealed to diametrically opposed openings 73 in the cathode 20a are suitable bellows structures 74 which permit micrometer adjustment of the two anode sections 56 inside the tube. Since these two bellows structures are substantially identical, a description of the left one will suffice for both.

This structure 74 comprises a suitable sleeve 76 extending radially outwardly from the respective opening 73, which is terminated in a suitably rigid flange 77. To the sleeve 76 is secured a vacuum-tight flexible bellows 78 of conventional construction which is secured at its distal end, in vacuum-tight relation, to the feed-through insulator 63.

An anode-adjusting device comprises a suitable ring 79 which surrounds the sleeve 76 in abutting relation with the flange 77. Another ring 80 abuts the left-hand end of the bellows as illustrated and receives therethrough for free rotation three angularly spaced adjusting screws 81. The right-hand ends of these adjusting screws are threadedly received by sutiable openings 82 in the fixed ring 79. Adjustment of the three screws 81 will serve to distort the bellows 78, thereby causing a shift in position of the respective anode section 56. This adjustment should be of a micrometer fineness whereby the anode sections 56 may be properly positioned with respect to each other in order to achieve proper tube operation. Springs 99 around screws 81 are used to remove any backlash present.

Feeding into the sleeve 76 is a gas inlet 33a and extending away from the other bellows sleeve 83 is an exhaust duct 31a. A power supply 50a having two different output voltages of 120 kilovolts and 140 kilovolts, for example, as indicated by the reference numerals 84 and 85, is coupled to the anode sections in the manner illustrated. As will be noted in the drawings, a higher voltage is applied to the inner and outer anode cups 57 and 58 than to the center cup 61; however, these voltages may be reversed, as will become apparent from the description to follow. A suitable source of modulating voltage 51a is connected to the grid 22a by means of a grid lead 86 which is insulated from the cathode 20a. Proper impedance matching is provided by a suitable transformer 87. Means are supplied for adjusting the amplitude of the modulating voltage in the form of a variable capacitor 88. Biasing potential of either positive or negative polarity is also supplied to the grid by means of the biasing battery 89.

The physical dimensions of this tube of FIG. 10 are essentially the same insofar as the tube elements are concerned as those of the first embodiment already described. However, in this embodiment the anode radius is two centimeters (2 cm.) as measured between the center 26 and the surface of the inner cup 57.

In operation, potentials and gas pressure are applied to the tube as described in connection with the first embodiment. In doing so, the two anode sections 56 become an electron lens producing equipotential surfaces, as indicated generally by the reference numeral 90 of the plot of FIG. 11. From this plot it will be noted that essentially spherical equipotential surfaces are provided, these surfaces corresponding, in operation, to the spherical configuration of anode 21 of FIG. 1. Electrons emitted by the cathode 20a are converged as before onto the anodic center 26a for establishing the virtual cathode. The gas inside the tube is ionized the same as previously explained, resulting in nuclear reactions in the vicinity of this center 26a. Inasmuch as the anode 21a is completely open to the flow of space current, and is confined essentially to that angle between the two diameters 69 and 70, none of the space current can be intercepted by the anode. Similarly, any space current which happens to migrate laterally beyond the boundaries of the diameters 69 and 70 is intercepted by the ring flanges 71, thereby preventing such space current from getting into the space behind the anode and thereby being intercepted.

Similarly, the ring flanges 71 serve as masking elements providing a shield or shadow effect for any electrons emitted by the cathode to the rear thereof, thereby tending to prevent any space current emitted by the corresponding portions of the cathode from being intercepted by the anode. In order to concentrate the space current onto the center 26a and to further minimize the possibility of any space current being intercepted by the anode, the cup elements 57, 58 and 61 of the anode may be changed slightly in curvature or configuration to alter the shape of the equipotential surfaces 90 in such a manner that space current is focused effectively onto the point 26a.

The space current beam has the geometrical configuration of a solid sphere with two coaxial conical sections removed. The boundaries of this beam are represented by numerals 91 and 92. The electrons of this beam tend to spread across these boundaries by reason of the mutual forces of repulsion, whereupon they may be intercepted by the anode structure 56.

It is the purpose of the radial flange 72 to counteract this spreading tendency in much the same manner as in the electrode configuration of the Pierce gun.

The combined effect of this flange 72 and of the electron lens (which may be characterized as an Einzel lens) formed by the anode cups 57, 58 and 61 serves to focus the space current onto the center 26a. The lens structure 56 is a special form of an Einzel lens and has been illustrated only schematically. It will be obvious to persons skilled in the art that many other electron optical devices will serve the same purpose. For a discussion of Einzel lenses, see Spangenberg "Vacuum Tubes," pages 386 and 387. Also, the values of 120 kilovolts or 140 kilovolts are intended to be illustrative only. The precise values are those required for focusing.

The only electron current which will, therefore, not be prevented from being intercepted by the anode sections 56 will be that due to electrons liberated upon the creation of ions.

This tube structure obviously may be incorporated in a complete power-producing system such as the one of FIG. 7 in place of the tube therein illustrated.

Third embodiment

Referring more particularly to FIG. 13 which illustrates the third embodiment in diagrammatic form, an evacuated spherical electron tube structure is shown which comprises a spherical cathode shell 100 and a spherical anode shell 101, these electrodes being arranged concentrically. The anode 101 is electron permeable and may be considered as being substantially open. Suitable connections are made to these electrodes, a lead 102 being connected to the anode 101 and a lead 103 to the cathode 100. Potentials of proper polarity and suitable parameters are applied to cathode 100 and anode 101 by direct current power supply 120a and radio frequency supply 120, as shown, these potentials being such as to control electron flow from cathode to anode. The inner surface of the cathode 100 carries an electron-emissive material or apparatus which may be photoelectric, thermally or secondary emissive or a combination thereof.

Independent means for producing ions so that the number of such ions can be varied independently of the other parameters of the space discharge, such as gas pressure, electron current, and the like are illustrated in the form of an ion gun 106. This gun is attached to the cathode shell 100 as shown and comprises a cathode 107, a control grid 108, and an anode 109, all being connected in circuit as shown. An aperture 110 provided in the cathode shell 100 forms a part of the ion optical system which collimates and directs an ion stream 111 through the anode 101 toward the exact center 104. The envelope of the ion gun 106 as well as the cathode shell 100, since they open each into the other, may be considered as having the same degree of vacuum therein. However, two tubulations 112 and 113 at opposite ends of the ion gun envelope are provided through which controlled quantities of neutral gas may be introduced into the ion gun and residue gas drawn therefrom. The gas is introduced through the inlet tubulation 112, and the residue gas is exhausted from the outlet tubulation 113.

As the controlled quantities of neutral gas are introduced into the ion gun 106, electron emission flowing from the cathode 107 to the anode 109 ionizes the gas thereby providing positively charged particles. At this point it may be stated that the construction of this ion gun is conventional, an ion-optical system being employed in combination with the aperture 110 whereby ions are propelled by potential differences in the total tube structure which directs the ions along the stream path 111 into the space of the anode 101. As is shown in FIG. 13, the cathode 107 and anode 109 are connected to the anode 101, a source of direct current potential, shown as a battery 114, being connected in series with the anode 109 to maintain the latter at a small voltage, for example, 100 volts, greater than the anode 101.

The order of vacuum which a vacuum pump connected to the outlet tubulation 113 must develop is a pressure of $10^{-9}$ to $10^{-10}$ millimeters of mercury in order to permit good outgassing and to insure that inleakage is low so that contaminants will be at a minimum. However, it should be understood at this point that while the vacuum pump is required to develop this vacuum, the tube will actually be operated at a higher pressure.

The gas which is introduced through the tubulation 112 is preferably deuterium and tritium in equal portions, but as will be understood from the following description, other gases may be used without departing from the spirit and scope of this invention. This introduction of gas is controlled such as to allow the neutral gas pressure in the cathode shell 100 to rise to about $10^{-6}$ to $10^{-7}$ millimeters of mercury. Of course, the exact pressure will depend upon preferred design and operating characteristics.

Joint contribution to space charge of ions and electrons

As illustrated in FIG. 14, the potential gradient inside the anodic space due to electrons alone is substantial, the potential being a maximum adjacent to the anode and a minimum at the center. This distribution, however, is profoundly affected by the presence of the ions as already described in connection with FIG. 2a. The dashed line curve 115 (FIG. 15) in combination with the solid line curve 116 represent the potential distribution due to electrons alone. These two joined curves 115 and 116 correspond identically to the solid line curve of FIG. 14. The curve 117 in combination with curve portion 116 represents the potential distribution which results from the combined contributions of both the ions and the electrons under operating conditions as are more fully explained hereinafter. This curve 117 is enlarged in FIG. 16.

In the description which immediately follows, the ionic effect on the potential distribution will be qualitatively examined with quantitative data being given later. As a first assumption, ions are introduced at the inner anode surface and are practically at rest at this point. The potential drops from this surface radially inwardly, so that the ions are accelerated. In moving, they contribute positive space charge, i.e., they reduce the total negative space charge inside the anode. The potential drops more sharply toward the virtual cathode, so that the potential distribution, which without ions was that of FIG. 14, now follows the curve 117. Since the ions near the anode 101 move at low velocity, their space charge effect is greatest in that region; in approaching the virtual cathode the velocity increases and consequently the contribution to the space charge is less. Since they reduce, however, the negative space charge wherever they are present, the electrons are capable of penetrating more deeply toward the center than would be possible without ions. Thus the virtual cathode 118 establishes itself at a smaller radius than the cathode 119a (FIGS. 15 and 16) which is created by electrons alone in the absence of ions. At the virtual cathode 118 the potential is of course still zero, thus a very abrupt potential drop occurs just outside of it as shown by the steep portion of curve 117. Such a region of high potential gradient immediately adjacent to cathode 118, which is very narrow radially, is characterized as a "potential gradient sheath."

Next, it is necessary to examine the ions as they move inwardly from the virtual cathode 118; as the ions move radially toward the center, their density increases as $1/r^2$, where $r$ is the radius from the geometric center 104 to the point where the density is being measured. The positive space charge builds up until a potential maximum forms immediately adjacent the inner periphery of the virtual cathode 118 (see FIG. 17). Thus, a virtual anode "N" is formed inside the virtual cathode 118, at a minute but finite distance from center 104. The virtual anode thus is a locus (a point "N" on the curve of FIG. 17) at which the potential is a maximum and the potential gradient is zero.

The presence of this virtual anode "N" again influences electrons. Thus far, we have considered them to be repelled at the virtual cathode. They have zero or almost zero velocity at this point, but at the virtual cathode 118 they now find the potential rising in both directions, radially inwardly and outwardly. Hence a substantial fraction of the electrons will move inwardly across the virtual anode, and thereafter form another virtual cathode 119 (FIG. 17) inside the virtual anode "N."

While at this point it appears as though an infinite number of alternate virtual cathodes and anodes can be expected, their number is actually quite limited. It must be borne in mind that neither the ions nor the electrons are travelling precisely radially; moreover, there is a velocity spread within both the ion and electron groups. As a result, the points where either the ions or electrons reverse their direction of motion do not lie on mathematically thin surfaces but instead at the virtual anodes and cathodes or sheaths having a finite radial thickness. As soon as the distance between a virtual anode and the adjacent virtual cathode becomes of the order of this thickness, they merge and the process of developing alternate virtual electrodes ceases.

Generally speaking, any device which reduces the velocity spread of the ions and electrons facilitates the formation of more than one virtual electrode. It is one of the main objectives here to provide means for achieving this result of producing multiple virtual electrodes because the region in which the ions are concentrated is thereby made smaller. This increases the probability of fusion. Generally, this objective is accomplished by the insertion of ions from the outside so as to render the ion velocities more uniform, by the provision of improved electron-optical means to obtain electron radial paths, and by the provision of proper gas pressure.

As previously explained in connection with FIGS. 2a and 4, ions born close to the anode 21 become projectiles by reason of the high potential difference between the anode 21 and the virtual cathode at the center 26 which is at zero or cathode potential. The same condition prevails for ions born adjacent to the virtual anode "N" (FIG. 17), since they experience the potential difference between this virtual anode "N" and the virtual cathode 119 (FIG. 17), this potential difference being of a magnitude which propels them at nuclear-reacting energies through the virtual cathode 119 (FIG. 17) and center 104, 26. For the mode of operation depicted by FIG. 17, the virtual anode "N" may be compared to the tangible anode 21, the space charge therein being as already explained in connection with FIGS. 2a, 4 and 5. This space charge produces electric fields which trap low energy target ions in the central region defined by the virtual cathode $P_2$, $P_3$ (FIG. 2a) and 119 (FIG. 17) and propels projectile ions from the region of the virtual and real anodes at nuclear-reacting energies through this same central region, collisions of these projectiles with the targets producing fusion.

Inasmuch as the paths of the projectile ions intersect this central region, such paths may be considered as converging from a plurality of zones lying on an imaginary spherical surface which is concentric with respect to said central region.

*Competing effects in the discharge*

In the immediately preceding discussion, the ions and electrons have been considered as moving past each other, interacting only through the respective space charges. There are a number of other atomic processes which can occur, however, and it will be shown in the following that the design of the apparatus can be such as to minimize some of these effects and put the others to good advantage. For this reason, a further discussion of these effects which were previously set forth is in order.

As has already been explained, the high energy ion will oscillate radially through the anodic space. This oscillatory action will continue until one of three possibilities occurs:

(1) The ion path is changed by the "scattering process";

(2) The ion "captures" an electron or recombines with an electron and becomes a neutral atom; or (3) The ion is absorbed by a nuclear reaction which is a desired result.

(a) *Scattering*

As has already been explained "scattering process" refers to the phenomenon of forces of repulsion experienced by two ions approaching each other from different directions. If this happens, it will occur as the ion passes through the center, because here the ion density is about a million times greater than anywhere else along the ion's path. The ion will be deflected from its path by an encounter with another ion by a large or small angle, depending only on how closely the two ions come to each other.

It is assumed that the particle density at the center is large enough to insure that the overall probability of fusion is high and closely approaches unity: this requires an ion density on the order of $10^{18}$ particles per cubic centimeter in the minute volume of the center. Taking this as the density through which the ion must pass each time it crosses the center, it is found on the basis of Rutherford's scattering formula (as found in "An Outline of Atomic Physics" by Blackwood et al., published in 1933 by John Wiley & Sons, Inc., of New York, on page 44) that for $10^6$ trips across the center the probability that the ion will be deflected through an angle less than 8° is 0.9. That is, for one million trips through the center, the probability is only 10% that it will receive a deflection greater than 8° of arc. Now let it be supposed that the ion is deflected through this angle or even a slightly greater angle. This deflection does not mean that the new path of the ion will not be radial. Since the deflection occurs very near the center of the sphere, the new oscillatory path will also be very nearly radial. The ion can continue to oscillate along the new path and will still cross near but not quite through the center.

It is just as well to limit the number of ion trips to about one million in order to prevent scattered ions from increasing the size of the minute volume in the center in which fusion reactions take place.

(b) *Capture and recombination*

An ion can be neutralized by an encounter with an electron. This can happen in two different ways: an ion can collide with a neutral atom and rob it of its electron (this is denominated "capture"), or the ion may collide with the free electron and recombine with it, thereby becoming a neutral atom. Generally speaking, both of these processes have a substantial probability of occurring (or in other words have a high cross-section) only if the two colliding particles have about the same velocity.

The capture process can occur only in a region wherein the ion velocity is low; that is, in the region near the actual anode 101. This region is indicated in FIG. 16 by the term "capture region," the portion of the potential distribution within this region having only a gentle slope.

As electrons always travel much faster than ions, the only region in which recombination can occur is close to the virtual cathode 118 where the electron velocity is lowest and ion velocity is highest.

Not much happens when capture occurs. There is very little energy transfer between the two particles other than the transfer of an electron from one nucleus to the other. The old ion which has become a neutral atom retains almost all of its velocity, and since it is no longer influenced by the electric field, it simply travels onward until it strikes some solid object, an electrode or the tube wall.

The newly formed ion has only the energy it had at the time of the encounter. It begins an oscillatory motion of its own through the center and with no record of having been previously deflected. The newly formed ion may be considered to be continuing to multiply the average number of trips through the center, started by the old ion, but with the disadvantage of having suffered an energy loss.

The electron capture cycles may be repeated about seven times before the energy loss becomes too great for fusion to occur. An average of only five (5) or at most six (6) capture cycles will occur before the ion either will have been lost by fusion or neutralization with the free electron (recombination).

When recombination occurs, a neutral atom results which travels outwardly until it is either reionized by another electron or ion or migrates out of the tube. It is desired, of course, to maintain the instances of recombination to as low a value as possible inasmuch as this results in loss of energy through radiation as well as loss of both ions and electrons in the space charge.

As a matter of fact, since the virtual cathode 118 in which this recombination can occur is radially quite small, the instances of recombination are correspondingly low. The same conditions are true with respect to the additional virtual cathodes which have already been discussed.

Thus, it may be momentarily summarized that scattering may be rendered negligible by limiting the number of ion trips through charge-exchange capture. It will now be shown that this number of trips, hence capture, can be controlled.

The extent of "capture" may be calculated from the relationship which expresses the probability of "capture" per trip, "$P_c$," as follows:

$$P_c = P_n \sigma_c L$$

in which "$L$" is the length of ion path in centimeters, "$P_n$" is the neutral gas density in particles per cubic centimeter, and "$\sigma_c$" is the capture cross-section in cm.[2]

The highest possible value for "$P_c$" is unity (1), since this means that the event of capture occurs. The obvious minimum value of "$P_c$" is zero (0). From the formula, if the calculated value for "$P_c$" is $10^{-6}$, this means that an ion makes on an average of $10^6$ oscillatory trips before the event of capture occurs.

Values for capture cross-section may be obtained from the curve by Jackson and Schiff in "Physical Review," vol. 89, No. 2, page 359, 1953.

In the case at hand, it is desirable to limit the number of ion trips to about one million during the occurrence of from four (4) to six (6) capture cycles. If an average of four (4) captures is assumed, $$"P_c" \text{ becomes } \frac{4}{10^6} = \frac{1}{.25 \times 10^6}$$

Also assuming as an example, a path length, "$L$," of 0.135 centimeter, the value of neutral gas density "$P_n$" may be solved for by the equation:

$$P_n = \frac{P_c}{\sigma_c L} = \frac{1}{250,000 \times 10^{-16} \times .135}$$

$P_n$=approximately $3 \times 10^{11}$ particles/cm.$^3$ for a value of "$\sigma_c$" equal to $10^{-16}$ cm.$^2$ Thus, it is readily observed that the control of capture, which in turn governs to a major extent the shape of the potential distribution, is achieved by adjustment of gas pressure since capture cross-section is inversely proportional to gas density.

Bunching

The circulatory ion current, hence the ion density in the center, can be increased only by an increase in the circulatory electron current if stable operation is to be maintained. For a given electron current density, the ion current density through the fusion center may be increased by "bunching" the ions as they cross the center in much the same manner as electrons are "bunched" in the Klystron.

To accomplish ion "bunching" the position of the virtual cathode is shifted radially at a frequency corresponding to the ion oscillatory period.

The length of the ion path for the major group of ions in the center is on the order of 0.135 centimeter. The ion frequency depends, of course, on the anode potential used, but will be in the range of 250 to 500 megacycles. This higher value corresponds to an anode potential of 140 kilovolts.

There are several possible methods for modulating, in other words, shifting, the virtual cathode, one such method being the application of a radio frequency voltage between the cathode 100 and anode 101 as illustrated in FIG. 13. Another possibility, also illustrated in FIG. 13, is to modulate the ion gun 106 with a radio frequency voltage, as by radio frequency supply 120b, such that the ions in the stream 111 are modulated in intensity.

Assuming that modulation of the anode 101-cathode 100 is used with the radio frequency voltage of approximately 150 volts supplied by the power supply 120, this voltage being a sinewave as illustrated in FIG. 19, the intensity of electron space current converging on the center 104 will be varied periodically, this resulting in the oscillatory shifting movement of the virtual cathode as just explained previously. As a consequence, the potential gradient propelling the ions through the center 104 will vary periodically, thereby imparting a corresponding velocity change to the oscillating ions. This will result in some ions travelling faster than others with the consequence that the faster ions will overtake and "bunch" with the slower ions as the center 104 is approached. The ion density in the center is thereby increased. This bunching or density increase is graphically illustrated in FIG. 18, the dots representing ions along selected diametral paths.

An idealized tube structure in which the nuclear reactions contemplated by this invention might be carried out, if it were possible to build such a structure, would comprise a spherical anode freely permeable to electrons and enclosed by a concentric spherical cathode adapted to emit electrons from its inner surface.

A practical structure uses a perforate anode and an electron optical system for simulating the field of a spherical permeable anode. In the following, like numerals with the suffix "$a$" will serve to indicate like parts. In one form of the tube (see FIGS. 20 through 36), the anode comprises a series of hollow cone-shaped elements 121 geometrically combined to form a dodecahedral outer solid. The large ends 122 of the cones are inscribed circles in the faces of a dodecahedron and the sides of the cones 121 lie along radii of an imaginary sphere which is circumscribed around the dodecahedron. While the dodecahedron is herein specifically disclosed, it will be understood by persons skilled in the art that other polyhedral shapes of either irregular or regular form may be used without departing from the spirit and scope of this invention.

As is more clearly illustrated in FIG. 21, the anode element 101a is machined from a sphere of stainless steel, a concentric spherical cavity 123 being provided in the center thereof. The axes of the various cones 121 lie along radii of the sphere and intersect at the center 104 of the cavity 123. The smaller ends 124 of the cones open into the cavity 123 as is shown more clearly in FIG. 20. Geometrically, since the cone structure resembles a regular dodecahedron, the cones 121 are arranged in diametric pairs, each pair having a common axis which coincides with a tube diameter, more clearly illustrated in FIG. 20.

Concentrically positioned inside the anode element 101a and more specifically in the cavity 123 is an anode lens element 125, also formed of stainless steel, this element 125 being a thin spherical shell provided with conically shaped apertures 126 in registry with respective apertures 124 of the cones 121. This element 125 is fixedly supported within and spaced from the anode 101a, this spacing and the sizes of the apertures 126 being described in more detail hereinafter. As will appear from the description later following in connection with FIG. 28, this element 125 may be omitted in achieving another operative embodiment of this invention.

A spherical cathode shell 100a of stainless steel concentrically surrounds the anode 101a and has secured to the inner wall thereof twelve (12) cathode or dynode elements 127 having electron-emissive surfaces (dynodes) 128 which are segments or zones of a sphere. Each of these dynodes 127 faces one of the anode cones 121, the radius of curvature of each face 128 being about one-half of the radius of the shell 100a. The center of curvature lies along a tube diameter which coincides with the respective anode cone axis, the dimensions of this radius being explained more fully hereinafter.

Each dynode 127 is securely fixed to the cathode shell 100a by means of a stud 129 or the like, this stud being hermetically sealed to the shell 100a to prevent inleakage.

As are the anode cones 121, the electron-emissive surfaces 128 are oppositely arranged in diametric pairs in registry with respective pairs of anode cones.

Interposed between the dynodes 127 and the shell 100a is a collector-electrode 130 of stainless steel. This electrode 130 is in the form of a spherical shell and is mounted concentrically with respect to the cathode shell 100a.

The collector 130 is provided with a series of openings 131 into which are fitted sleeves 132 of insulating material such as boron nitride. These insulator sleeves 132 are snugly, telescopically fitted over the circumference of the respective dynodes 127, thereby serving to support the collector 130 and to insulate it from the dynodes.

A suitable electrical connection in the form of a lead 133 is connected to the collector 130 and passes outwardly through the anode shell 100a through a suitable bead 134 or the like of insulation.

The anode 101a is concentrically supported inside the cathode 100a by means of a rigid assembly which is illustrated in more detail in FIGS. 20 and 22. FIG. 20 illustrates that portion of the assembly inside shell 100a while FIG. 22 shows the external portion. This assembly comprises a tapered sapphire probe 135 having an axial bore 136 through which passes a suitably heavy lead or conductor 137. This conductor is threaded at its inner end 138 and screwed into a threaded opening 139 in the anode 101a (see FIG. 20).

The probe 135 is secured to the shell 100a to extend radially inwardly. This mounting is provided by an annular collar 140 threaded into a companion opening in the shell 100a and which receives therethrough the outer end of the probe 135. The probe 135 is hermetically sealed to the collar 140 by means of a Kovar or the like ring 149 suitably welded at one end to the nut 140 and sealed at the other end to the probe.

Surrounding the collar 140 and hermetically sealed to the outer surface of the shell 100a is a metallic sleeve 141. The outer end of this sleeve 141 is suitably secured and sealed to a porcelain or the like insulator 142. The insulator 142 is provided with an axial bore 143 through which the conductor 137 passes. A suitable metallic disc 144 (FIG. 22) is fitted over the outer end of the insulator 142 and is hermetically sealed thereto as well as to the high voltage conductor 137. As seen more clearly in FIG. 20, the probe 135 passes through a clearance aperture 145 in the collector 130.

The inner anode element 125 is concentrically supported inside the anode 101a by means of a second radially disposed probe assembly 146 (FIGS. 20 and 23). The inner end of this probe projects through an opening 147 in the anode 101a, the projecting end 148 of the probe conductor being threadedly secured to the anode element 125 as shown. Otherwise, the probe assembly is constructed essentially the same as probe assembly 135, like numerals with the suffix "a" indicating like parts.

As is more clearly illustrated in FIGS. 20 and 25, the cathode shell 100a, collector 130, anode 101a and the anode-electrode 125 are fabricated in hemispherical halves suitably joined together to provide the spherical shapes. However, since the space inside the cathode shell 100a is evacuated, it is necessary to hermetically seal the same, and for this purpose the shell 100a halves are provided with mating flanges 150 and 151 suitably welded together. Any suitable means may be used for joining the hemispherical halves of the other electrodes together.

As explained earlier in connection with FIG. 13, an ion gun 106 is secured to the cathode 100 for injecting ions into the anode cavity. This structure is shown in FIG. 26 wherein the circuit connections as well as some of the structural components are shown in diagrammatic form. Other ion gun structures may be used such as the one illustrated and described in "The Review of Scientific Instruments," January 1948, on page 28.

Anode 101a is provided with a radial aperture 152 which is in registry with apertures 153 and 154 in collector 130 and cathode shell 100a, respectively. These three apertures 152, 153 and 154 are radially aligned with the cathode aperture 155 in the ion gun 107. Electron emission from cathode 107 to anode 109 ionizes gas therebetween which is electrostatically concentrated into a beam and directed through the remaining aperture 155 as well as the remaining apertures 154, 153 and 152 and finally through another aperture 156 in inner anode element 125. Because of the polarities and values of the supply voltages, as shown in FIG. 26, connected to the ion gun elements and the anode 101a, 125, the ions produced inside the ion gun are at a slightly higher potential than is the anode 101a, 125 whereby they are propelled through the anode aperture 152 and into the cavity inside the element 125. The structure of the ion gun is conventional, any structure capable of emitting an ion beam for the stated purpose being acceptable.

Typical operating voltages of 160 kilovolts applied to the shell 125, 140 kilovolts applied to anode 101a, 150 volts R.F. applied between shell 100a and anode 101a, and 100 volts applied between anode 109 and anode 101a may be used.

The apparatus of FIGS. 20 through 26 functions essentially in the same manner as the diagrammatically illustrated arrangement of FIG. 13 as already explained. The complete tube may be considered as comprising twelve (12) electron guns, all aligned to focus the electrons to the common point 104 in the center of the sphere. Electrons which flow from the dynode surfaces 128 through and into the interior of the anode 100a, 125 produce an electrical field which is the equivalent of the field which would result if a large negative charge were located at the center 104. A uniform current density through the anode is all that is required to provide the continum of equipotential surfaces which are spherical. When each gun focuses at the center 104, electron paths are such that no electrons are picked up by the anode 100a, 125, as will be explained in more detail hereinafter. Fringe electrons in the dynode beams are collected by the collector 130 and are thereby prevented from reaching the anode 100a, 125. By providing proper gas pressure, operating potentials, dimensions and spacing of the various electrodes, a heavy concentration of oscillating ions in the center of the tube will be produced, these ions interacting to produce the desired nuclear reactions.

Alternative to the apparatus just described, the ion gun 106 may be entirely omitted in connection with the starting of the generation of ions. By forming the cathode surfaces 128 of a good photoelectric (such as caesium-antimony) or secondary emissive material, electron emission results from internal irridation due to recombination or from ion and electron impact. In starting tube operation, ions inherently present in the gas start recombining, and some impact the cathode at the moment the operating voltages are applied; oscillating electrons also impact the cathode and produce secondary electrons; electron emission from the cathode surfaces thereby progressively increasing until the space current develops to operating level. As the space current increases, more ions are produced until equilibrium between the number of ions and electrons is reached. Thus, the ion gun may be eliminated from the apparatus in achieving this additional mode of operation.

For a different mode of operation, the power supply of FIGS. 13 and 26 may be pulsed at a desired repetition rate such as 60-cycles or at a higher radio frequency. The shape of the power pulses may vary from one mode of operation to another, a rectangular spike being one suitable shape.

Electron optics

Two different embodiments of electron optics are diagrammatically illustrated in FIGS. 28 and 29. The embodiment of FIG. 29 having the inner anode shell 125 corresponds to that already disclosed in connection with FIG. 20 et seq. The simpler optics of FIG. 28 wherein the anode shell 125 is omitted will be considered first, the operating voltages and other parameters remaining as explained in connection with FIGS. 20 through 26 and as shown in FIG. 26.

Since the structure of the anode 101a has a profound effect on the paths followed by the electrons, hence the formation of the respective electron beams, proper design of that structure as well as the electron-emitting cathode 128 is quite essential. Relatively simple and well known formulae relating to electron-optics are available for the purpose of mathematically arriving at the proper dimensions of the various parts, as will now be shown.

Referring specifically to FIG. 28, of the twelve (12) electron guns, one is shown as comprising the cathode 128 and conical anode element 121. The surface of this cathode 128 is spherical with the center at C, the radius being about one-half that of the shell 100a. The radius of this cathode 128 is given as $r_{c1}$.

An electron emitted by the cathode 128 at any point on its surface, for example at A, moves substantially in a straight line toward the point C. Even if the electron does not initially leave the cathode perpendicular to its surface, its transverse velocity component is quite small against its longitudinal velocity which it acquires under the influence of the applied voltages. These transverse components may be neglected for the geometrical analysis as given in the following.

At the point B, the electron enters the aperture 122 of the anode cone 121. At this aperture 122 is formed an aperture lens by virtue of the fact that there is a strong field gradient in the region AB, but a negligibly small one inside the cone 121. The focal length $f_1$ of this aperture lens is given by the equation $$f_1 = \frac{4V_a}{E}$$

(see Spangenberg, "Vacuum Tubes," published 1948 by McGraw Hill & Co., Inc., Formula #13.56), wherein $V_a$ is the anode voltage and E is the potential gradient. The effects of space charge on E and $f$ are calculated in detail in the following section entitled "Lens Calculations."

The preceding assumes ideal lenses and electron paths. Actually, there will be some deviation due to lens aberration, astigmatism, electron scattering, etc. Any of these deleterious effects gives the electrons a motion which is unprescribed, usually a non-radial or transverse component of velocity. Such irregular electron motions are equivalent to an increased electron temperature, and it is therefore important to eliminate the stray electrons having such irregular motions.

The collector 130 located around the periphery and in back of each cathode surface 128 (FIG. 20) serves to collect and remove from the respective beams any electrons which develop even a small excess non-radial motion. Not only does this limit the electron temperature, but also prevents any such stray electrons from being intercepted by the anode. This reduces to a minimum the current in the external anode circuit.

This is more clearly understood by considering FIG. 20 wherein the conical spaces which may be occupied by the respective electron beams are representatively indicated by the reference numerals 157 and 158, the outer peripheries of these spaces coinciding with the perimeters of the respective cathodes 128. There is some angular space between the outlines of these two spaces 157, 158 and the walls of the respective conical anode elements 121 such that any electrons in this space travelling radially outwardly will miss the perimeter of the respective cathode surface 128 and thereafter be collected by the collector 130 in the immediate path thereof. Thus, fringe electrons so collected are prevented from turning rearwardly and being intercepted by the anode 101a there- by limiting the anode circuit current as well as the electron temperature.

*Particle flow in a spherically symmetrical field*

In connection with the design of the beam-forming optics as just explained in the preceding section, it is necessary to know the potential gradient E for calculating the focal length $f_1$ and also $E^1$ for $f_2$ the focal length of the divergent lens at the inner cone aperture 124. In this section, the considerations involved in calculating this potential gradient as well as other factors important in connection with the overall tube design effort are given.

The laws by which charged particles move toward the center in a spherically symmetrical field have been described by Langmuir & Blodgett ("Physical Review," vol. 24, #2, 1924). Spangenberg, in his book entitled "Vacuum Tubes" submits that the space charge equation for electrons is:

(8) $$I_{eo} = \frac{29.34 \times 10^{-6} V^{3/2}}{\alpha^2}$$

wherein "$I_{eo}$" is the total current in amperes, V the voltage in volts, and $\alpha^2$ is a function of the radius (more strictly a function of $r/r_c$ wherein "$r_c$" is the radius of the electron-emitting surface and "$r$" is the radius at any point "X") which can be found in the table which follows or in tabular form in Appendix VII of the aforementioned Spangenberg book; also it can be determined by formula 8.32 on page 181 of Spangenberg. Spangenberg distinguishes two functions, designated as $\alpha^2$ and $(-\alpha)^2$, the first one applying to the case that voltage V is evaluated at a point X outside an electron-emitting sphere; the second at a point X inside such a spherical source.

Since Equation 8 expresses how a space charge affects the current-voltage relationship, the term "$I_{eo}$" in this invention becomes the circulating electron current which was described earlier. This current is calculated for the entire sphere.

The Equation 8 has been derived for the simple case involving an electron discharge with no ions present. The subscript "$eo$" for the letter "I" signifies the absence of ions. However, if ions are present, a new parameter $\lambda$ is introduced as follows:

(9) $$\lambda = \frac{I_p}{I_e} \sqrt{\frac{M_p}{M_e}}$$

$\lambda$ is the ratio of the circulating currents $I_p/I_e$ of positive ions and electrons, corrected to account for the different masses. "$I_e$" is the circulating electron current in the presence of ions. The space charge formula can be used unchanged, but the denominator (see Equation 8) in the new case will be termed $\mu^2$ which is calculated as a different function of the radius than is $\alpha^2$. As will become apparent, the term $\mu^2$ also depends upon the factor $\lambda$.

Thus Equation 8 will be replaced by equation (8a) $$I_e = \frac{29.34 \times 10^{-6} V^{3/2}}{\mu^2}$$

and "$\mu$" is a new function of $r/r_c$ which is given in the following table. This table gives, with $\lambda$ as a parameter, the values of $\mu_a^2$ and $\alpha_a^2$; that is, the values of $\mu^2$ and $\alpha^2$, respectively, at the anode position, as functions of $r_a/r_c$.

For intermediate values, $\mu^2$ may easily be calculated, because by dividing Equation 8 by Equation 8a, it follows that $$\frac{I_{eo}}{I_e} = \frac{\mu^2}{\alpha^2} = \frac{\mu_a^2}{\alpha_a^2}$$

and since $\alpha$ is known from the reference literature, $\mu^2$ is determined.

| $\dfrac{r_a}{r_c}$ or $\dfrac{r_c}{r_a}$ | $\alpha_a{}^2$ | $(-\alpha_a)^2$ | $\lambda=0.2$ | | $\lambda=0.4$ | | $\lambda=0.6$ | | $\lambda=0.8$ | | $\lambda=1$ | |
|---|---|---|---|---|---|---|---|---|---|---|---|---|
| | | | $\mu_a{}^2$ | $(-\mu_a)^2$ | $\mu_a{}^2$ | $(-\mu_a)^2$ | $\mu_a{}^2$ | $(-\mu_a)^2$ | $\mu_a{}^2$ | $(-\mu_a)^2$ | $\mu_a{}^2$ | $(-\mu_a)^2$ |
| 1.6 | .1688 | .2968 | .1330 | .2520 | .0972 | .2071 | .0614 | .1623 | .0255 | .1174 | ------- | .0730 |
| 1.8 | .248 | .502 | .2067 | .4431 | .1654 | .3842 | .124 | .3258 | .0827 | .2664 | .0414 | .2075 |
| 2.0 | .326 | .750 | .279 | .676 | .2321 | .6019 | .1852 | .5278 | .1382 | .5213 | .0913 | .3798 |
| 2.2 | .402 | 1.036 | .3497 | .9463 | .2975 | .8566 | .2452 | .7668 | .193 | .6771 | .1407 | .5874 |

$r_a$ = the anode radius.
$r_c$ = the radius of a selected cathode.
$\alpha_a$ = the value of $\alpha$ when $r = r_a$.
$\mu_a$ = the equivalent of $\alpha_a$ but in the presence of ions.
$\mu$ = the equivalent of $\alpha$ but in the presence of ions.

The values of the foregoing table may obviously be varied slightly depending upon the final design requirements and operating characteristics desired of the apparatus. Like the table for $\alpha^2$ in Spangenberg's book, the values of $\alpha^2$ are obtained mathemtically. The quantity $\lambda$ was introduced by Langmuir (see "Physical Review" #33, page 954, June 1929) wherein it is shown that $\lambda$ (called $\alpha$ in Langmuir's paper) cannot exceed the value of unity (1) if the ions are injected at the anode. While the calculations of this paper refer to a plane parallel "discharge," the same reasoning applies also to the present invention.

Lens calculations

Consider once again the path of an electron starting at the point "A" (FIG. 28) on the cathode 128. The point "A" is chosen on the periphery, because it represents an external ray and one for which the probability of striking the anode 101a, 121 is greatest. This electron is accelerated along the radius AC of the cathode 128. The divergent lens at the opening 122 formed by the anode cone refracts the electron away from the cone axis so that it leaves the cone along the line BD. BD is tangent to the electron's path at the exit 124 of the cone just as AB is tangent to the beginning of the path.

There is another divergent lens located at the small end 124 of the cone where the electron undergoes further refraction. When ions are present in appreciable quantity, however, the power of this second lens is diminished by a factor of the order of two-thirds (⅔) against its power for electrons only. It is convenient to account for the action of the second lens (at 124) by considering the first lens (at 122) to have slightly greater power. Thus if the first lens at 122 has a focal length to cathode radius of

(10) $$\frac{f_1}{r_{c1}} = 0.83$$

(a value used in a practical tube which has been tested) a good approximation is obtained by assuming

(11) $$\frac{f_1}{r_{c1}} = 0.81$$

Much effort is thereby saved in the computation and the approximation is satisfactory. These values are for $\lambda = 0.7$ but may be used for the range $\lambda = 0.6$ to $0.8$.

The focal length of the divergent lens at 122 is approximated from the simplified formula

(12) $$\frac{f_1}{r_{c1}} = \frac{-3\alpha}{\frac{d\alpha}{dR}}$$

where $$R = \frac{r_{a1}}{r_{c1}}$$

Having obtained the focal length normalized to the cathode radius $r_{c1}$, the distance $b_1$ from the principal plane of the lens to the point 104 where the ray crosses the cone axis is given by

(13) $$\frac{b_1}{r_{c1}} = \frac{1}{\frac{r_{c1}}{f_1} + \frac{r_{c1}}{r_{a1}}}$$

Again the formula is simplified, but it is accurate enough for most purposes.

In the practical tube referred to previously for which $$\frac{f_1}{r_{c1}} = 0.83$$

and considered to be 0.81, other values in Formula 13 are $r_{c1} = 1.17$ inches   $r_{a1} = 0.532$ inch $$\frac{r_{c1}}{r_{a1}} = 2.2$$

and $b_1$ is therefore $b_1 = 1.031 \cdot r_{c1}$
$b_1 = 1.206$ inches

Ions formed in the sphere between the real cathode 128 (or dynode) and the anode 101a do not oscillate, but make only a single trip to the cathode. Consequently, the discharge may be considered to be a pure electron current. This current is given by the formula $$I_{co} = \frac{29.34 \times 10^{-6} V_a{}^{3/2}}{(-\alpha_a)^2}$$

where $(-\alpha_a)^2$ is a function of the natural logarithm of the ratio of radii $$\frac{r_{c1}}{r_{a1}} \text{ or } \frac{1.17}{0.532} \text{ inches}$$

in the example which is being used.

As a result of the divergence produced by the anode cone lens at 122, the current density is increased at the principal plane (at aperture 122) of the lens. This increase in the current density is given by the formula

(15) $$J_1 = \frac{\sin^2 \frac{\phi}{2}}{\sin^2 \frac{\theta}{2}} J_2$$

in which $\theta$ is the entrance angle, $\phi$ is the exit angle of the lens element as shown in FIG. 28, and $J_1$ is the electron current density at the entrance to the lens and $J_2$ is the electron current density at the exit thereof.

Upon emergence from the cone aperture 124, the electrons form the virtual cathode 118 from which they are reflected so that these electrons do not actually reach the focus at 104. In the absence of ions, the position of this virtual cathode may be calculated from the formula

(16) $$\alpha_2{}^2 = \frac{J_1}{J_2} \alpha_1{}^2 = \frac{\sin^2 \frac{\phi}{2}}{\sin^2 \frac{\theta}{2}} \alpha_1{}^2$$

One of the problems in the design is to prevent electrons returning from the virtual cathode from striking the inner surface of the anode 101a (the tips of the anode cones). This may be conveniently accomplished by selecting the radius of the cathodes 128 such that with the correct spacing of the anode 101a from the cathode, the extended path of a peripheral electron crosses the axis of the cone 121 at a point "E" (FIG. 28) which lies close to the center 104 and between the particular anode cone 121 and the center 104.

After reflection from the virtual cathode 118 at "F" the peripheral electron travels back into the anode aperture along a line GF which intersects the axis at a point "G" on the opposite side of the center 104 from the point E and by a distance E–104 which is equal to 104–G.

When the returning electron reaches the principal plane at the point K, it is again bent away from the axis by the lens action and travels along a path, the tangent of which at the cathode 128 is the line KL.

The electron's path KL is not quite along a radius. There is a small component of non-radial velocity directed toward the axis of the cone. The electron is reflected from the cathode but retains the non-radial component of velocity.

The successive passages of the electron progressively approach the cone axis, with the electron acquiring an additional small amount of transverse or non-radial velocity at each passage until the electron path crosses the axis. After the path has progressed to the opposite side of the axis, successive passages decrease rather than add to the non-radial component of velocity, and when the electron's path reaches the edge of the cathode 128 opposite to the point at which it originated, there will again be no non-radial component of velocity and the electron behaves just as though it had originated from that side.

Accordingly, when $b_1$ is made slightly less than the distance of the principal plane of the lens to the center 104 of the tube, no electrons can strike the anode as they are always reflected inwardly toward the cone axis.

In FIG. 28 the angles between incident and reflected rays have been exaggerated for clarity. These angles are small in practice and only large enough to include the largest non-radial component which is present in the initial velocity spread of the emitted electrons. If these angles were excessively large, the electrons would initially be reflected away from the anode, but at the same time they would also miss being collected by the collector 130 until eventually at the end of the transverse swing they would be intercepted by the anode. Thus, the electrons have the largest probability of escaping the anode if the angle (BFK in FIG. 28) is kept small.

In FIG. 28, the electron path starting at the periphery of the dynode (at "A") crosses the axis at "E." However, the spherical aberration of any lens is such that the lens has the greatest power for the peripheral rays; hence an electron starting at a point "A'" on the dynode surface 128 near the periphery but spaced inwardly from point "A" will just pass through the center 104. Electrons starting at a point on the dynode surface 128 radially inside of "A'" will tend to cross the axis beyond the center 104, e.g., near point "G" in FIG. 28, but this is of no concern inasmuch as these electrons are in no danger of being intercepted anyway.

It is also seen that the number of electrons which are removed from the discharge by the collector 130 depends on the collector voltage. This number determines the average number of trips which an electron makes, because the higher the probability of electron collection, the shorter will be the time an electron contributes to the discharge. Therefore, adjusting the collector voltage affords a means of controlling the number of electron trips.

When there are ions present along with the electrons, the equation for the electron current has the same form as Equation 14 with the quantity $\mu^2$ substituted for $\alpha_a^2$, as explained in the preceding section "Particle Flow in a Symmetrically Spherical Field." We have $$(17) \qquad I_e = \frac{29.34 \times 10^{-6} V_n^{3/2}}{\mu_a^2}$$

Values of $\mu_a^2$ have been computed for the pertinent range and are included in the table set forth hereinbefore.

In Equation 17, the current is the circulating current through the anode 101a. Since this current is the same on both sides of the anode, Formula 17 solved for $V_a$, may be used to determine the potential distribution.

These calculations are close approximations since they are based on coaxial cylindrical shapes instead of conical shapes, so it may be necessary to make slight changes in dimensions for a final design having prespecified operating characteristics.

Keeping in mind the method just employed in calculating the dimensions of the lens elements of FIG. 28, it will now be self-evident that the same method may be employed in calculating the dimensions of the lens system as illustrated in FIG. 29. In FIG. 29, the anode includes two frusto-conical parts 121 and 125 which have different voltages applied thereto as already explained in connection with FIG. 26. This results in the addition of another optical lens at point J, which is formed by the proximity of the two parts 121 and 125. With the addition of the smaller frustum 125, one more step must be added to the derivations given hereinabove. Formulae for the focal length of this structure are not immediately available from reference material, but the optical properties of similar lenses formed by two coaxial cylinders have been tabulated by Spangenberg on pages 369–382. Calculations based on this tabulation will yield a usable approximation in the present instance. The focal length of the added lens 125a depends not only on the geometry but also on the ratio of the two voltages applied to the respective parts 121 and 125. This being true, it becomes possible to adjust the focusing conditions while the tube is in operation by merely altering the ratio of these two voltages. Hence, the mathematical calculations need only be approximate.

The same formulae as given hereinabove can be used to determine other properties of the discharge.

It might be asked, for instance, what the electron current is in the presence of ions, the tube voltage being unchanged. The equation at once obtainable is:

$$\frac{I_e}{I_{eo}} = \frac{\alpha^2}{\mu^2}$$

wherein $\mu$ is evaluated from the given value of $\lambda$ (the number of injected ions will control $\lambda$). Here, $I_e$ is the current borne by electrons in the presence of the ions, $I_{eo}$ the current in a pure vacuum discharge.

The formulae also provide a method for locating the outermost virtual cathode 118 (FIG. 17) of radius $r_{c2}$. It is not possible directly to apply Equation 8 with $(-\alpha)^2$, because the electrons do not enter the space inside the anode with zero velocity. Instead the electrons are considered as returning radially outwardly from the virtual cathode 118, starting this return with an initial velocity of zero. Hence, if the space charge Equation 8 is used, substituting for "I" the previously found circulatory current and for "V" the anode 101a voltage, there results a certain value of $\alpha^2$ and therefore of $$\frac{r_{c2}}{r_{a2}}$$

wherein $r_{a2}$ is the radius of the inner anode 121 edge (FIG. 28) and $r_{c2}$ is the radius of the virtual cathode 118. This, however, does not yet take into account the presence of positive ions; hence, the calculation should be based on $\mu^2$ instead of $\alpha^2$. This calculation locates $r_{c2}$, the position of the first virtual cathode. Also, we are now in a position to calculate the focal length of the lens for cone aperture 124 (FIG. 28) which is $$f_2 = \frac{3\mu}{\frac{d\mu}{dr}}$$

where for $\mu$ the value just found is used and $d\mu/d_r$ is the rate at which $\mu$ changes with respect to "$r$" near the inner anode edge 124.

Finally, the radius of the adjacent virtual anode "N" (FIG. 17) $r_{a3}$ is determined. Again, considering the ions moving outwardly from this virtual anode, it is seen that they start with negligible speed at radius $r_{a3}$ and acquire their full velocity as given by the voltage $V_a$ at $r_{c2}$ (radius of the virtual cathode 118). Hence the space charge Formula 8 using $(+\mu)^2$ instead of $(+\alpha)^2$, determines the value of $\mu$ and hence of $r_{a3}$ if the current $I_p$ is known. This is possible, since the value of circulating electron current $I_e$ has already been found hereinabove, and the factors $I_e$ and $\lambda$ in Equation 9 determines $I_p$.

The same method of calculating may now be repeated for determining the radii of successive virtual cathodes and anodes moving radially inwardly, the number of such cathodes and anodes being limited as explained earlier. These example calculations are sufficient to show that the behavior of the discharge in the tube is entirely predictable. The mathematical procedure as outlined above enables the person skilled in the art to design the apparatus as well as to understand its mode of operation.

As will now be apparent, design parameters may be altered to establish the position of point 104, the parameters of all twelve (12) electron guns being designed and adjusted such as to obtain only a single, common point 104 near the centermost virtual cathode. While other electron gun designs are possible for achieving this end result, the ones already given are exemplary as well as the one now to follow.

As explained, $\lambda$ is the ratio of the circulating currents $I_p/I_e$ corrected to account for the different masses. Thus, the number of ions, or in other words the gas pressure, affects the value of $\lambda$. Also $\lambda$, in part, determines the power of the lens at aperture 124 such that control of gas pressure may be used in fixing the focal point of this lens.

Calculations and experiments show that as the value of $\lambda$ approaches unity, the lens at 124 tends to disappear, whereupon the point 104 is made to move toward the point E (FIG. 28). Thus, varying gas pressure can be used in establishing the precise position of point 104.

Another variable in establishing the position of point 104 is the positioning of the cathode 128 along the axis G, E, C (FIG. 28) closer to or farther away from the anode cone 121. An example of this is illustrated in FIG. 30 wherein like numerals and symbols indicate like things. In this figure, the cathode 128 is shown as being moved closer to anode come 121 from the dashed line configuration which duplicates the position for FIG. 28. This results in changing the gradients in the space between cathode 128 and anode 121 which in turn can be shown as providing a lens effect in the anode cavity.

As already given, the circulating electron current, $I_e$, varies as a function of $\mu$ according to the equation $$I_e = \frac{29.34 V^{3/2}}{\mu^2} \times 10^{-6}$$

When cathode 128 is moved closer to the anode, $I_e$ increases thereby reflecting a change in the value of $\mu^2$ and represents an increased length for the radius $r_{c2}$ since $r_{a2}$ is constant. The virtual cathode 118 now takes on a new radius, $r_{c3}$, thereby establishing a different cathode 118a of slightly larger radius.

The new virtual cathode 118a has zero potential and therefore acts as a mirror. An electron from cathode 128 traveling along refracted arrow "$e_1$" would cross the axis at 104a except that the virtual cathode 118a reflects the electron along the path of arrow $e_2$, this latter arrow extended passing through the precise center 104. By reason of the larger radius $r_{c3}$, the reflected angle will be inward; hence, the electron will not be picked up by the anode 101a (or cone 121). The virtual cathode 118a therefore acts as the lens at 124 of FIG. 30 in establishing the center 104.

The effect of moving cathode 128 closer to anode 121 will likewise be seen as increasing the density of the total beam in the peripheral regions thereof which results in producing the virtual cathode 118a of larger radius $r_{c3}$ (FIG. 30).

It will now be apparent that consideration of the opposite case (moving cathode 128 farther away from anode 121) results in decreasing the radius $r_{c2}$ and correspondingly alters the inner lens (at 124) effect.

Allied to the subject of "Particle Flow in a Spherically Symmetrical Field" is the effect which the radio frequency voltage from the supply 120 (FIG. 13) has on the existence and location of the virtual cathodes and anodes already described. While this voltage serves in producing a "bunching" as already explained, it also is responsible for the creation of additional virtual cathodes and anodes which may not coincide in position with those developed under only D.C. voltage conditions. It therefore is necessary to adjust the amplitude, and in some instances the frequency, of this R.F. voltage by increments upwardly or downwardly until these virtual electrodes are moved into spatial coincidence, this coincidence being visually observed as a steady glow pattern in the anode cavity. Absence of coincidence produces an unstable glow which may flutter in size and intensity, this instability being due to the virtual electrodes moving into and out of step periodically.

This phenomenon is attributable to the fact that the value of $\mu$ changes when the voltage amplitude is altered. Since, as already explained, $\mu$ is a function of the natural logarithm $r_{a2}/r_{c2}$, it is at once apparent that adjustment of the amplitude (and frequency if necessary) provides means for stabilizing operation of the tube.

The preceding discussions of the electron-optics points up the fact that the lens design depends to a great extent on the existence and the magnitude of the space charge in the anodic space. In a practical embodiment of this invention, when the voltages are initially applied, this space charge does not instantaneously form but requires a short time. Thus, the electron-optics vary in design during this formation period. As a consequence, it has been found that the anode draws excessive current for a short instant, but immediately following, the current drops to its normal low value for normal continuous operation.

*Alternative collector arrangement*

Referring to FIGS. 31 and 32, an alternative design for the collector shell 130 as shown in FIG. 25 comprises tubular elements 187 immediately surrounding the individual dynodes 127. These tubular elements 187 are concentrically supported on the respective dynodes 127 by rings 188 of insulation which fit into annular grooves 189 in the peripheries of the dynodes 127. The inner end or tip 190 of each element 187 is tapered inwardly starting at the perimeter of the concave surface 128 in substantially a radial direction so as to conform to the taper of the anode cone as shown in FIGS. 28 and 29. The element 187 may be formed of aluminum or stainless steel, preferably gold-plated, to minimize secondary electron emission.

Suitably fastened to each dynode 127 and extending radially inwardly from the perimeter of the concave surface 128 is a circumferential series of U-shaped wires 191 formed of gold-plated molybdenum or tungsten. Conductively secured peripherally to the U-shaped wires are a plurality of annular wires 191a axially spaced apart. These U-shaped wires 191 extend parallel to the tip 190 and are substantially coextensive therewith. They are electrically connected to the respective dynodes 127 and carry the same potential. This ring of U-shaped and annular wires may be considered as a mesh or grid which is electron permeable.

In the central portion of each dynode 127 is a relatively deep coaxial recess or bore 192 which serves a purpose to be explained in more detail hereinafter.

This dynode-collector 127, 187 assembly may be substituted for the dynode-collector 127, 130 of FIG. 20, the other portions of the total structure remaining the same.

One of the purposes for this alternative collector 187 is to reduce the current collected by the anode 101a (FIG. 20). In the operation of the invention, primary electrons from the main beams extending between the dynodes 127 which strike the collector 130, 187 produce secondary emission in a ratio greater than unity. The secondary electrons so emitted have enough initial velocity to overcome the attracting field of the collector; hence, they are attracted toward and collected by the anode 101a. This results in an undesirably high anode current.

In overcoming this excessive anode current due to secondary emission from the collector, the annular grid formed by the ring of U-shaped wires 191 and annular wires 191a serves as a suppressor whereby any secondary electrons emitted by the collector tips 190 are repelled back to and collected by the tips and are thereby prevented from flowing to the anode 101a. Therefore, even though the secondary emission ratio of the collector 190 may exceed unity, still the retarding field as set up by the suppressor grid 191, 191a serves to prevent or substantially reduce the flow of the secondary electrons to the anode. Similarly, secondary electrons emitted by the wires 191 and 191a are attracted to the collector 190.

The collector 187 with its tip portion 190 serves in another respect to minimize or reduce anode current. As shown in FIG. 26, a source of radio frequency voltage is applied between the anode 101a and the cathode 100a. The electrons in the beams formed between the diametrically opposite dynode surfaces 128 have periods of oscillation and transit time which are directly related to the frequency of this radio frequency voltage, the electrons leaving the dynode at one instant of time absorbing power from the field established by the voltage and the ones leaving at another instant of time giving up energy to the field. In the former instance, the electrons are said to be in phase with the applied voltage, whereas in the latter instance they are out of phase.

The electrons oscillate between diametrically opposite dynode surfaces 128 at approximately the same frequency as the radio frequency itself accelerates the electrons and they make one trip between dynodes in less than a half period of the radio frequency. The fact that the electrons are so accelerated insures that they strike the dynode surfaces 128. The returning electrons also make the trip in slightly less than one-half cycle. The result is that the fastest electrons very rapidly get out of phase with the radio frequency voltage.

The process results in electrons being fed from the multiplication (in-phase) phase into the opposite phase wherein an electron is decelerated rather than accelerated by the radio frequency. Electrons in this phase do not strike the dynodes at all, but continue to oscillate between them, delivering energy to the external circuit as they are slowed down by the radio frequency. This action is a phenomenon well known in the art of electron multipliers of the multipactor type, typical multipactors being disclosed in Farnsworth Patents Nos. 2,189,358 and 2,107,782.

The electrons which are in phase have an oscillatory swing which carries for a distance greater than that between two facing dynode surfaces 128 such that the electrons impact the surfaces with enough force to eject secondary electrons at a ratio greater than unity to provide electron multiplication; however, the out-of-phase electrons will be decelerated and will never quite reach the dynode surfaces.

The decelerated electrons do not strike the dynode surfaces 128 but continue to oscillate between them, and in doing so form a number of virtual cathodes as represented by the dashed lines 193 and 194, respectively, adjacent the dynode surface 128. The virtual cathode 193 is established by that group of decelerated electrons which oscillate over a path length slightly shorter than the diameter between opposite dynode surface 128, this cathode 193 thereby acting as an electron mirror. The second or inner virtual cathode 194 is similarly established by a second group of decelerated electrons which oscillate over a still shorter path length. As shown in FIG. 31, the collector tip 190 projects beyond both virtual cathodes 193 and 194 for a reason to be explained hereinafter.

As the operation proceeds, electron multiplication continues and the electrons successively swing into and out of phase with the applied radio frequency voltage as described more fully in Farnsworth et al. Patent No. 2,107,782.

If the electrons in the outer boundary of the beam 157, 158 (FIG. 20) follow a path which just misses the perimeter of the dynode surface 128 and further has a large enough swing to carry it behind the surface 128 toward the collector 130 (FIG. 20), the field as set up by the collector will be strong enough to attract the electrons thereto (FIG. 20). However, for the shorter swing electrons in this same boundary region, the field of the anode 101a will be much greater than that of the collector 130, whereupon the electrons will fall backwardly into the anode.

Now referring to the improved collector arrangement of FIG. 31, it will be noted that the collector tips 190 extend forwardly with respect to the dynode surfaces 128. The out-of-phase or decelerated electrons in the fringe regions of the main beam are now more readily collected by the tips 190, since the collector field penetrates more deeply toward the anode 101a and beyond the virtual cathodes 193 and 194. Thus, for those electrons in the outer regions of the main beam, whether they be in-phase or out-of-phase with the applied radio frequency voltage, they will be more readily collected by the collector 187.

As explained previously under the section "Lens Calculations" in connection with FIG. 28, the successive passages between dynodes 127 of an electron initially emitted from the peripheral edge of one dynode surface 128 results in the electron progressively approaching the cone or dynode axis and then proceeding toward the opposite side of the dynode surface. This is due to the fact that the electron possesses a small amount of transverse or non-radial velocity. It is desirable to reduce the number of electrons which can move beyond the dynode periphery, in order to minimize anode 101a current. This is facilitated in the dynode configuration of FIGS. 31 and 32 by a deep bore 192 in the dynode surface 128. As electrons traverse from a radially outer region of the surface 128 toward the center thereof, they eventually reach the central portion at which they may fall into the bore 192. Since inside this bore the potential is the same as that of the dynode itself, the electrons which penetrate the bore will be thereby trapped and cannot escape. Thus, these captured electrons are effectively prevented from traversing from one edge of the dynode surface to the extreme other edge. The effective benefit gained from this capture of electrons is the reduction of those electrons which may escape from the main beam and thereby be collected by the anode 101a.

It is found in practice that the bore 192 improves the uniformity of the current distribution across the dynode.

*Design summary*

From the values for focal length, it is obvious that the dimensions of the electron lens may be calculated, the anode and cathode structure being a part of this lens. Also, as explained under the heading of "Capture and Recombination," the gas density may be calculated and adjusted to provide the operating characteristics desired.

In the following tabulation are given typical dimensions of the last-described operating embodiment of this invention, it being understood that these dimensions are given as exemplary only and not as limitations. This table should be considered in connection with FIG. 27 which is the lens configuration already described in connection with FIG. 29. Like numerals indicate like parts.

| Reference numeral: | Dimension |
|---|---|
| 159 | 1.820 inches. |
| 160 | 1.600 inches (inner diameter of openings 131). |
| 161 | 1.590 inches (outer diameter of portion of sleeve 132 which fits into opening 131). |
| 162 | 1.5 inches O.D. |
| 163 | 1.25 inches I.D. |
| 164 | .225 inch. |
| 165 | .060 inch. |
| 166 | .366 inch. |
| 167 | .690 inch. |
| 168 | .895 inch. |
| Shell 100 | .060 inch thickness. |
| 169 | .155 inch. |
| 170 | .110 inch. |
| 171 | .328 inch. |
| 172 | 30°. |
| 173 | 2.500 inches radius. |
| 174 | 2.225 inches radius. |
| 175 | 2.125 inches radius. |
| 176 | 1.208 inches radius. |
| 177 | .4375 inch radius. |
| 178 | .25 inch radius. |
| 179 | .3125 inch radius. |
| 180 | .125 inch. |
| 181 | 61°. |
| 182 | 63° 26.1 minutes. |
| 183 | .055 inch. |
| 184 | 87° about center M'. |
| 185 | 1.170 inches radius about center M'. |
| 186 | 55.5°. |

*Suitable materials*

| | |
|---|---|
| Dynode 127, 128 | Beryllium copper. |
| Anode 101a, 125 | Stainless steel (low boron content). |
| Cathode shell 100a | Stainless steel (low boron content). |
| Collector 130 | Stainless steel. |
| Bushings 132 | Boron nitride. |
| Probes 135 and 135a | Sapphire or boron nitride. |
| Gas used | Tritium and deuterium in equal portions. |
| Neutral gas pressure | $2 \times 10^9$ to $2 \times 10^{10}$ neutral atoms per cubic centimeter at 0° C. |
| Gas temperature (introduced) | Room temperature. |
| Anode 101a voltage | 140 or 160 kilovolts. |
| Anode element 125 voltage | 50% to 75% anode 101a voltage. |
| RF supply voltage | 0 to 150 volts adjustable at $10^6$ to $10^8$ cycles per second. |

While I have described above the principles of my invention in connection with specific apparatus, it is to be clearly understood that this description is made only by way of example and not as a limitation to the scope of my invention.

What is claimed is:

1. In an electric discharge device for producing nuclear reactions, an envelope having a cathode therein, said cathode having a generally spherical inner surface, an anode positioned inside said cathode and having portions mutually defining an open region in the center portion of said spherical inner surface to provide an equipotential field throughout said region, said anode having other portions respectively which bound a space current region extending diametrically across said cathode through the central portion of said open region, said anode being electron permeable and free of all tangible structure in said space current region, masking elements fixedly positioned between said anode and cathode and extending into the marginal portions of said space current region to intercept electrons in said marginal portions, electron optical means including said anode and said cathode for forming a space current which occupies said space current region and converges toward said central portion, circuit means for applying an electron-collecting potential to said masking elements, means for supplying fusion reactive gas to said open region, and means connected to said cathode and anode for developing said space current to an intensity which produces a virtual electrode surrounding said central portion and a potential gradient which accelerates ions of said gas through said central portion at nuclear-reacting velocities.

2. In an electric discharge device for producing nuclear reactions, cathode means for emitting electrons, an electron permeable anode enclosing a region of space free of tangible structure, said means surrounding said anode, means including said cathode means and said anode for forming a space current and for converging said space current toward a reference point in said region for producing a localized virtual cathode, means for preventing the interception of a portion of said space current by said anode, said space current being of a magnitude which produces a potential distribution in said region of minimum negative value adjacent to said virtual cathode and of maximum positive value radially outwardly therefrom adjacent to said anode, ions in said region of space, said minimum and maximum potential values being such as to propel ions through said virtual cathode at nuclear reacting velocities, and means for periodically varying the radial position of said virtual cathode at a frequency which produces bunching of the ions in said region.

3. In an electric discharge device for producing nuclear reactions, anode means providing an equipotential surface defining a given volume free of tangible structure, means for introducing gas atoms into said volume, cathode means disposed radially outwardly from said anode means, electron-optical means including said cathode means and said anode means for focusing electrons emitted by said cathode means toward a point in said volume to form a virtual cathode in the vicinity of said point, and power supply means for applying a potential to said cathode means and anode means of such magnitude as results in propelling ions of said gas through said virtual cathode at nuclear reacting velocities.

4. In an electric discharge device for producing nuclear reactions, an envelope having a cathode therein, an anode positioned inside said cathode and having portions defining an open region, said anode having other portions respectively which bound a space current region extending rectilinearly through and beyond directly opposite sides of said anode, said space current region having an electron cross-over point in the center portion of said open region and diverging radially outwardly from said point, that portion of the space current region which extends through said anode being free of all tangible structure, and means for providing a gas in the open region of said anode.

5. In an electric discharge device for producing nuclear reactions, an anode having an open interior, said anode and said open interior being generally spherical in shape and concentric with respect to each other, said anode having a plurality of apertures, said apertures being arranged in diametrically opposite pairs, an envelope surrounding said anode and having a plurality of electron emissive surfaces which are in radial registry with said apertures, means including said anode apertures and the respective electron emissive surfaces for producing and focusing a plurality of electron beams onto the center of said open interior thereby providing a virtual cathode in said open interior, there being one electron beam for each of said aperture pairs, and means for admitting a fusion-reactive gas to said open interior.

6. In an electric discharge device for producing nuclear reactions, an anode which bounds a sphere of space, said anode having open areas on diametrically opposite sides of said sphere of space to provide a space current region, said space current region being free of all tangible structure, cathode means having an electron emissive surface radially spaced outwardly from said sphere of space, said anode open areas being essentially in registry with said electron emissive surface so that said space current region extends to said electron emissive surface, a control grid interposed between said anode and cathode means and across said space current region, a predetermined quantity of fusion-reactive gas inside said anode, and means for applying operating potentials to said anode, cathode and control grid.

7. In an electric discharge device for producing nuclear reactions, an anode having an open interior, said anode and said open interior being generally spherical in shape and concentric with respect to each other, said anode having a plurality of apertures, said apertures being arranged in diametrically opposite pairs, an envelope surrounding said anode and having a plurality of electron emissive surfaces which are in radial registry with said apertures, means including said anode apertures and the respective electron emissive surfaces for producing and focusing a plurality of electron beams onto the center of said open interior thereby providing a virtual cathode in said open interior, there being one electron beam for each of said aperture pairs, means for collecting electrons in the peripheral portions of said beams to prevent such electrons from reaching the anode, and means disposed radially beyond said anode for generating and injecting ions into said open interior.

8. In an electric discharge device for producing nuclear reactions, a cathode assembly of spherical configuration, a spherical anode concentrically positioned inside said cathode assembly and having a concentric spherical open region in the center thereof, said anode having a plurality of open portions therethrough which respectively bound space current regions extending diametrically across said cathode assembly and having a common electron cross-over point in the central portion of said open region, said anode being electron permeable and free of all tangible structure in said space current regions, said cathode assembly including a plurality of dynodes radially aligned with said anode open portions respectively, each dynode having an electron-emitting surface facing radially inwardly, means for introducing a gas into said anode open region, and a plurality of collector elements, there being one collector element for each dynode, each collector element surrounding each dynode surface and extending radially inwardly thereof toward said anode, whereby electrons in the outer fringe portions of the respective space current regions are collected by said collector elements.

9. In an electric discharge device for producing nuclear reactions, a cathode assembly of spherical configuration, a spherical anode concentrically positioned inside said cathode assembly and having a concentric spherical open region in the center thereof, fusion-reactive gas in said open region, said anode having a plurality of open portions therethrough which respectively bound space current regions extending diametrically across said cathode assembly and having a common electron cross-over point in the central portion of said open region, said anode being electron permeable and free of all tangible structure in said space current regions, said cathode assembly including a plurality of dynodes radially aligned with said anode open positions respectively, each dynode having an electron-emitting surface facing radially inwardly, the perimeter of each dynode surface being spaced inwardly a given distance from the periphery of the respective space current region, said perimeter being circular and the dynode surface being concave facing said anode, a plurality of collector elements, there being one collector element for each dynode, each collector element being tubular in shape and surrounding the dynode surface perimeter in a location which is intersected by an annular portion of the respective space current region, each collector element extending from the perimetral region of the respective dynode surface inwardly toward said anode, a frusto-conically shaped grid on each dynode extending inwardly toward said anode from each dynode surface perimeter, said grid being electron permeable and disposed inside and radially spaced from said collector element to thereby serve as a suppressor.

10. The method of producing nuclear reactions comprising the steps of (a) converging positive ions of a fusion-reactive gas from spherically arranged sources toward a point-like region in free space, (b) converging electrons from spherically arranged sources toward the same region to thereby form a space charge of ions and electrons around said region, (c) controlling the charge distribution within said space charge to provide a virtual cathode in said region and a bounding virtual anode, and (d) establishing the value of the potential difference between said virtual cathode and virtual anode such that positive ions within said space charge will be propelled through said virtual cathode at nuclear-reacting energies.

11. In a device for producing nuclear reactions, cathode means and anode means disposed one inside the other, the innermost of said cathode and anode means defining a volume centrally located with respect to both which is free of tangible structure, a fusion-reactive gas within said volume, the inner of said cathode and anode means having openings for the traversal therethrough of charged particles, and means including said cathode means and said anode means for accelerating ions of said gas to fusion-reacting energies along paths which converge from a plurality of zones lying on an imaginary spherical surface and intersect in a point-like region within said volume.

12. In a device for producing nuclear reactions comprising cathode means and anode means disposed one inside the other, the innermost of said cathode and anode means defining a volume centrally located with respect to both which is free of tangible structure, a fusion-reactive gas within said volume, the inner of said cathode and anode means having openings for the traversal therethrough of charged particles, means including said cathode means, said anode means and ions of said gas forming a space charge in the central portion of said volume, said space charge including electrons and ions of said gas which are so distributed as to produce a substantially spherical electric field which confines target ions in a point-like region in said central portion and oscillates projectile ions through said region at nuclear-reacting energies, whereby fusion reactions result from collisions between said projectile and target ions.

13. The device of claim 12 wherein the inner of said cathode and anode means includes a conductive shell-like element provided with a plurality of peripherally arranged apertures which receive ions and electrons therethrough, said element enclosing said volume and said space charge.

14. The device of claim 12 wherein the inner of said cathode and anode means includes a conductive shell-like element provided with a plurality of peripherally arranged apertures which receive ions and electrons therethrough, said element enclosing said volume and said space charge, and source means disposed adjacent to the outer of said cathode and anode means for generating and projecting ions of said gas into said volume toward said point-like region.

15. In a device for producing nuclear reactions, cathode means and anode means disposed one inside the other, the innermost of said cathode and anode means defining a volume centrally located with respect to both which is free of tangible structure, a fusion-reactive gas within said volume, the inner of said cathode and anode means having openings for the traversal therethrough of charged particles, means including said cathode means, said anode means and ions of said gas for forming a space charge in the central portion of said volume, said space charge including electrons and ions of said gas arranged in a configuration which provides a plurality of enveloping potential sheaths of positive and negative polarity, each sheath being of a polarity different than the adjacent sheath radially outwardly therefrom, the potential of the innermost sheath being adequate to trap and confine a multiplicity of ions as targets, the potential of an outer sheath being of a magnitude which accelerates and oscillates ions as projectiles through said innermost sheath at nuclear-reacting energies, whereby collisions of projectile ions with target ions produce nuclear reactions.

16. In an electric discharge device for producing nuclear reactions, first electrode means providing a spherical chamber free of tangible structure, second electrode means surrounding said first electrode means, third means for applying a potential between said first and second electrode means, means including charged particles, said first, second and third means for producing a potential distribution in said chamber which increases from a minimum value in the central portion of said chamber toward a more positive value radially outwardly from said central portion, means for supplying fusion-reactive gas to said chamber, means for ionizing said gas, the difference of potential between said minimum and positive values being of a magnitude which propels ions of said gas through said central portion at velocities which cause nuclear reactions.

17. In an electric discharge device for producing nuclear reactions, first electrode means defining a volume free of tangible structure, said first means having openings for the traversal therethrough of charged particles, second electrode means surrounding said first electrode means, third means for applying a potential between said first and second electrode means, means including said first, second and third means for producing a potential distribution in said volume which increases from a minimum value in the central region of said volume toward a more positive value radially outwardly from said region, and means for ionizing a fusion-reactive gas at a location external to said volume and for directing these ions through said openings into said volume, the difference of potential between said minimum and positive values being of a magnitude which accelerates ions in said volume through said central region at nuclear-reacting energies.

18. In a device for producing nuclear reactions, cathode means and anode means disposed one inside the other, the innermost of said cathode and anode means defining a volume centrally located with respect to both which is free of tangible structure, the inner of said cathode and anode means being open to the flow of gaseous particles therethrough, a fusion-reactive gas within said volume, means supplying a potential between said cathode and anode means for establishing an electric field therebetween, said cathode means having electron-emissive surface portions facing said volume, means including said cathode and anode means and said potential-supplying means for focusing electrons and ions along converging radial paths in said volume and also for accelerating ions to fusion-reacting energies along said paths.

19. The device of claim 18 wherein said volume is substantially spherical in shape, and said paths have a common intersection in the central portion of said volume, and further including means maintaining said fusion-reactive gas at sub-atmospheric pressure.

20. The device of claim 18 wherein the inner of said cathode and anode means has an inner surface which bounds and defines said volume, said inner surface being substantially spherical in shape and said paths having a common intersection in the central portion of said volume, the outer of said cathode and anode means having spherically arranged conductive portions spaced from the inner of said cathode and anode means and concentric with said volume.

21. The method of producing nuclear reactions in a conductive device permeable to gas flow and a spherically arranged conductive electrode concentrically surrounding said conductive device, said conductive device defining and surrounding a substantially spherical cavity, comprising the step of (a) evacuating said spherical cavity, (b) introducing a heavy hydrogen isotope gas into said cavity at sub-atmospheric pressure, (c) applying a potential between said conductive device and said electrode and ionizing said gas, and (d) establishing the magnitude of said potential at a value at which ions of said gas are directed toward the center of said cavity with sufficient energy to produce nuclear reactions.

22. The method of producing nuclear reactions comprising (a) evacuating a substantially spherical cavity disposed within concentrically arranged and radially spaced anode and cathode devices, one of said devices being inside the other, the inner of said devices being permeable to gas flow, (b) introducing a heavy hydrogen isotype gas into said cavity at sub-atmospheric pressure, (c) applying a potential between said anode and cathode devices for producing an electric field therebetween, and (d) establishing the magnitude of said field and the pressure of said gas at values at which nuclear reactions are produced within said cavity.

23. The method of producing nuclear reactions in an electric discharge device having cathode and anode devices, one of said cathode and anode devices being disposed inside the other and surrounding and defining a volume of free space, the other of said cathode and anode devices surrounding said inside one, comprising the steps of (a) converging electrons within said volume toward a point-like region therein, (b) converging positive ions of a fusion-reactive gas within said volume toward the same region to thereby form a space charge of ions and electrons around said region, (c) and applying a potential to said cathode and anode devices of such value that some of said ions will be propelled through said point-like region at nuclear reacting energies.

24. The method of producing nuclear reactions in an electric discharge device having cathode and anode devices, one of said cathode and anode devices being disposed inside the other and surrounding and defining a volume of free space, comprising the steps of (a) introdusing a fusion-reactive gas into said volume, (b) applying a potential between said cathode and anode devices and ionizing said gas, (c) converging electrons within said volume of free space toward a point-like region therein, (d) converging ions of said gas toward the same region thereby to form a space charge of ions and electrons around said region, (e) establishing the magnitude of said potential at a value which produces a space-charge distribution within said volume such that a multiplicity of spaced virtual electrodes of alternating polarity are created, one of said virtual electrodes being innermost and the others enveloping each other successively radially outwardly, said potential further being of a magnitude that develops a difference of potential between two of said virtual electrodes sufficient to accelerate ions through the inner of said two virtual electrodes at nuclear-reacting energies.

25. In a device for producing nuclear reactions, an anode means centrally disposed inside a cathode means, said anode means defining and surrounding a volume centrally located with respect to both means, said volume being free of tangible structure, a fusion-reactive gas within said volume, said anode means being at least partially open to the flow of said gas therethrough, means including said cathode means and said anode means for accelerating ions of said gas to fusion-reacting energies along converging radial paths within said volume having a common intersection, said accelerating means including electron-optical means for focusing electrons in said volume toward said intersection.

26. In a device for producing nuclear reactions, cathode means and anode means disposed one inside the other, the innermost of said cathode and anode means defining a volume centrally located with respect to both which is free of tangible structure, a fusion-reactive gas within said volume, the inner of said cathode and anode means being at least partially open to the flow of said gas therethrough, means including said cathode means, said anode means and ions of said gas for forming a space charge in the central portion of said volume, said space charge including electrons and ions of said gas arranged in a configuration which provides a plurality of enveloping potential sheaths of positive and negative polarity, each sheath being of a polarity different than the adjacent sheath radially outwardly therefrom, the potential of the innermost sheath being adequate to trap and confine a multiplicity of ions as targets, the potential of an outer sheath being of the magnitude which accelerates and oscillates ions as projectiles through said innermost sheath at nuclear-reacting energies, whereby collisions of projectile ions with target ions produce nuclear reactions, and ion gun means disposed adjacent to the outermost of said cathode and anode means for generating ions and projecting the same into said volume toward the region occupied by said innermost sheath.

References Cited by the Examiner

UNITED STATES PATENTS

| | | | |
|---|---|---|---|
| 2,189,358 | 2/1940 | Farnsworth. | |
| 2,200,722 | 5/1940 | Pierce et al. | 313—83 |
| 2,489,436 | 11/1949 | Salisbury. | |
| 2,884,559 | 4/1959 | Cooper et al. | 315—14 |
| 2,928,972 | 3/1960 | Nelson | 313—83 |
| 2,994,801 | 8/1961 | Hanks | 315—14 |
| 3,022,236 | 2/1962 | Ulrich et al. | 176—1 |
| 3,071,525 | 1/1963 | Christofilos | 176—4 |

FOREIGN PATENTS 654,306    12/1962    Canada.

REUBEN EPSTEIN, *Primary Examiner.*